United States Patent
Badii et al.

(10) Patent No.: US 12,314,295 B2
(45) Date of Patent: May 27, 2025

(54) SYSTEMS AND METHODS FOR MANAGING LOG DATA

(71) Applicant: Bitdrift, Inc., San Francisco, CA (US)

(72) Inventors: Behrooz Badii, Westport, CT (US); Alexander Thomas Berghage, Oakland, CA (US)

(73) Assignee: BITDRIFT, INC., San Francisco, CA (US)

( * ) Notice: Subject to any disclaimer, the term of this patent is extended or adjusted under 35 U.S.C. 154(b) by 15 days.

(21) Appl. No.: 18/090,949

(22) Filed: Dec. 29, 2022

(65) Prior Publication Data
US 2024/0220519 A1 Jul. 4, 2024

(51) Int. Cl.
*G06F 16/23* (2019.01)
*G06F 16/3332* (2025.01)
*G06F 40/205* (2020.01)

(52) U.S. Cl.
CPC ........ *G06F 16/3334* (2019.01); *G06F 16/235* (2019.01); *G06F 40/205* (2020.01)

(58) Field of Classification Search
CPC .................................................... G06F 16/235
See application file for complete search history.

(56) References Cited

U.S. PATENT DOCUMENTS

| | | | |
|---|---|---|---|
| 7,818,274 B1 | 10/2010 | Ottamalika | |
| 2012/0197914 A1 | 8/2012 | Harnett et al. | |
| 2014/0136840 A1* | 5/2014 | Spalka | G06F 21/34 713/165 |
| 2016/0292263 A1 | 10/2016 | Ferrar | |
| 2017/0139806 A1* | 5/2017 | Xu | G06F 11/3612 |
| 2018/0357299 A1* | 12/2018 | Miranda | G06N 5/04 |
| 2019/0205197 A1* | 7/2019 | Hartman | G06F 11/079 |
| 2022/0335318 A1* | 10/2022 | Wang | G06F 11/3409 |
| 2022/0343181 A1 | 10/2022 | Thomas | |

FOREIGN PATENT DOCUMENTS

WO 2019/060326 A1 3/2019

OTHER PUBLICATIONS

International Searching Authority. International Search Report and Written Opinion issued in International Application No. PCT/US2023/085665, mailed on Apr. 30, 2024, 7 pages.

* cited by examiner

*Primary Examiner* — Robert W Beausoliel, Jr.
*Assistant Examiner* — Nirav K Khakhar
(74) *Attorney, Agent, or Firm* — Lee Sullivan Shea & Smith LLP

(57) ABSTRACT

A computing platform may be configured to (i) receive a log entry that was produced by a log producer, wherein the log entry comprises one or more data elements, (ii) produce a restructured representation of the log entry, the restructured representation comprising a sequence of one or more tokens that represent the one or more data elements of the log entry, (iii) based on the restructured representation of the log entry, determine a log identity of the log entry, and (iv) handle the log entry in accordance with a handling rule for the determined log identity.

20 Claims, 12 Drawing Sheets

| | Representative Log Entry | Restructured Representation | Identity |
|---|---|---|---|
| 1 | {"level":"info","ts":"1658187879.58879","logger":"aeprox"} | [LogLevel][TimeStamp][Logger] | 33ywclaaH0BvXpxMogdezEXOFrLUI8B7UTWJqcT182g |
| 2 | {"level":"warn","ts":"1925223698.00101","logger":"aeprox"} | [LogLevel][TimeStamp][Logger] | 33ywclaaH0BvXpxMogdezEXOFrLUI8B7UTWJqcT182g |
| 3 | 10.23.46.27--["k8s_arch":"arm64","service_instance":"production"} | [IPAddress][K8s_arch][Service_instance] | jY9a-ulzoTDIYE_KL69G70IS95y8FspnvZgh4ZGceYY |
| 4 | | [NULL] | p_G-L8e12ZRwUdWoGHWYvWA_03kO0n6gtgKS4D4Q0o |
| 5 | 10.42.83.72--[19698.28151]--"GET /api/v1/query_range?end=2" | [IPAddress][TimeStamp][Network] | awmLfAZmUrOkus_XsfzOmt7RrtuFFaW-Ly8QCalcvr4 |
| 6 | 17.21.31.11--{"ts":"472346797.73243"}--"POST /api/v1/user_details" | [IPAddress][TimeStamp][Network] | awmLfAZmUrOkus_XsfzOmt7RrtuFFaW-Ly8QCalcvr4 |
| 7 | Processing items for bucket 1066 | ["Processing items for bucket"][Number] | IOnnLIGFOVQfVvFgHUhHbTTPI9nLj4TDRzYsKvsq5B0 |
| 8 | Processing items for bucket 24 | ["Processing items for bucket"][Number] | IOnnLIGFOVQfVvFgHUhHbTTPI9nLj4TDRzYsKvsq5B0 |
| 9 | Found user in cache | ["Found user in cache"] | 5jbcxu5_3YyrwFeyGEFKOVmDwptwDF3MOyEi9qbMPZY |
| 10 | Endpoint called | ["Endpoint called"] | L0ahYjl1FOOsyDaSzvig076gUzSLCB81-uYbaRs7p-0 |

| | Representative Log Entry | Restructured Representation | Identity |
|---|---|---|---|
| 1 | {"level":"info","ts":"1658187879.58879","logger":"aeprox"} | [LogLevel][TimeStamp][Logger] | 33ywclaaH0BvXpxMogdezEXOFrLUl8B7UTWJqcT182g |
| 2 | {"level":"warn","ts":"19252223698.00101","logger":"aeprox"} | [LogLevel][TimeStamp][Logger] | 33ywclaaH0BvXpxMogdezEXOFrLUl8B7UTWJqcT182g |
| 3 | 10.23.46.27--["k8s_arch":"arm64","service_instance":"production"} | [IPAddress][K8s_arch][Service_instance] | jY9a-ulzoTDIYE_KL69G70IS95y8FspnvZgh4ZGceYY |
| 4 | | [NULL] | p_G-L8e12ZRwUdWoGHWYvWA_03kO0n6gtgKS4D4Q0o |
| 5 | 10.42.83.72--[19698.28151]--"GET /api/v1/query_range?end=2" | [IPAddress][TimeStamp][Network] | awmLfAZmUrOkus_XsfzOmt7RrtuFFaW-Ly8QCalcvr4 |
| 6 | 17.21.31.11--{"ts":"472346797.73243"}--"POST /api/v1/user_details" | [IPAddress][TimeStamp][Network] | awmLfAZmUrOkus_XsfzOmt7RrtuFFaW-Ly8QCalcvr4 |
| 7 | Processing items for bucket 1066 | ["Processing items for bucket"][Number] | IOnnLIGFOVQfvFgHUhHbTTPI9nLj4TDRzYsKvsq5B0 |
| 8 | Processing items for bucket 24 | ["Processing items for bucket"][Number] | IOnnLIGFOVQfvFgHUhHbTTPI9nLj4TDRzYsKvsq5B0 |
| 9 | Found user in cache | ["Found user in cache"] | 5jbcxu5_3YywFeyGEFKOVmDwptwDF3MOyEi9qbMPZY |
| 10 | Endpoint called | ["Endpoint called"] | L0ahYjl1FOOsyDaSzvig076gUzSLCB81-uYbaRs7p-0 |

FIG. 1

First Log Entry 402A

{"level":"info","ts":"1658187879.58879","logger":"aeproxy"}

Second Log Entry 402B 10.42.83.72--[19698.28151]--"GET /api/v1/query_range?end=2"

Third Log Entry 402C

Failed to send record to elasticsearch

Fourth Log Entry 402D

Processing items for bucket 1066

Fifth Log Entry 402E 10.23.46.27--{"k8s_arch":"arm64","service_instance":"production"}

FIG. 4A

SYSTEMS AND METHODS FOR MANAGING LOG DATA

BACKGROUND

It is becoming increasingly common for software running on computing devices and systems to generate log data, which typically takes the form of a sequence of log entries that each records some event of interest that is detected by the software. For instance, a client application running on a client device (e.g., a mobile application, desktop application, web application, or the like) may generate log data to record events of interest that are detected during runtime sessions of client application. Likewise, a server application running on a server (e.g., a back-end service such as a microservice) may generate log data to record events of interest that are detected during runtime sessions of the server application. Other types of software components may be configured to generate log data as well, including operating systems of computing devices and/or firmware of networking devices such as routers, switches, and gateways, among other possibilities.

In practice, an organization may deploy or otherwise have responsibility for many different software components that generate log data, such as many different instances of a client application provided by the organization and/or many different instances of server applications running in the organization's back-end platform, and in order to make use of the log data produced by these disparate software components, the organization may operate a centralized "log management platform" that functions to collect, aggregate, and store log data from various different producers of log data (referred to herein as "log producers") so that the log data can later be accessed and reviewed. For instance, after a log management platform collects, aggregates, and stores log data from different log producers, individuals associated with the organization (e.g., developers, engineers, analysts) can review the stored log data in order to gain visibility into the behavior of the software components and/or the computing devices installed with the software components.

SUMMARY

Disclosed herein is new technology for intelligently managing log data that is produced by log producers.

In one aspect, the disclosed technology may take the form of a method that involves (i) receiving a log entry that was produced by a log producer, wherein the log entry comprises one or more data elements, (ii) producing a restructured representation of the log entry, the restructured representation comprising a sequence of one or more tokens that represent the one or more data elements of the log entry, (iii) based on the restructured representation of the log entry, determining a log identity of the log entry, and (iv) handling the log entry in accordance with a handling rule for the determined log identity.

The function of producing the restructured representation of the log entry may take various forms. For example, in embodiments where the one or more data elements of the log entry includes one or more key-value pairs, the function of producing the restructured representation of the log entry may involve one or both of (i) translating at least a first key-value pair of the log entry into a corresponding token that represents a key of the first key-value pair or (ii) parsing a value of at least a second key-value pair of the log entry into a sequence of tokens that each represents either (a) a key-value pair that is nested within the value of the second key-value pair or (b) an unstructured portion of the value that matches a respective type of pattern that is indicative of a known type of data element. As another example, in embodiments where the one or more data elements of the log entry includes one or more data elements expressed in an unstructured format, the function of producing the restructured representation of the log entry may involve applying a set of parser functions to the log entry, wherein each respective parser function (i) searches the log entry for a respective type of pattern that is indicative of a known type of data element, and (ii) if any portion of the log entry matches the respective type of pattern, translates the matched portion of the log entry into a token that represents the known type of data element. As yet another example, the function of producing the restructured representation of the log entry may involve (i) performing a first search of the log entry for data elements expressed in a structured format and translating any data element identified during the first search into at least one corresponding token that represents the data element and (ii) performing a second search of the log entry for data elements expressed in an unstructured format that match patterns indicative of known types of data elements and translating any data element identified during the second search into at least one corresponding token that represents the data element.

Further, the function of handling the log entry in accordance with a handling rule for the determined log identity may likewise take various forms, including but not limited to one or more of (i) blocking the log entry from being persistently stored, (ii) storing the log entry into a different tier of a multi-tier storage architecture, (iii) handling the log entry in accordance with a sampling rate for storing log data having the determined log identity, (iv) storing the log entry in a compressed format, and/or (v) using the log entry to derive a metric.

Further yet, the handling rule for the determined log identity may be defined in various manners, including but not limited to being defined based on (i) an analysis of write activity for log entries having the determined log identity, (ii) an analysis of read activity for log entries having the determined log identity, and/or (iii) an analysis of query activity for log entries having the determined log identity.

In another aspect, the disclosed technology may take the form of a computing platform comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing platform to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example of operations that may be performed in accordance with the present disclosure;

FIG. 4A illustrates examples of log entries that may be received by a log management engine, in accordance with the present disclosure;

DETAILED DESCRIPTION

Figure 2:
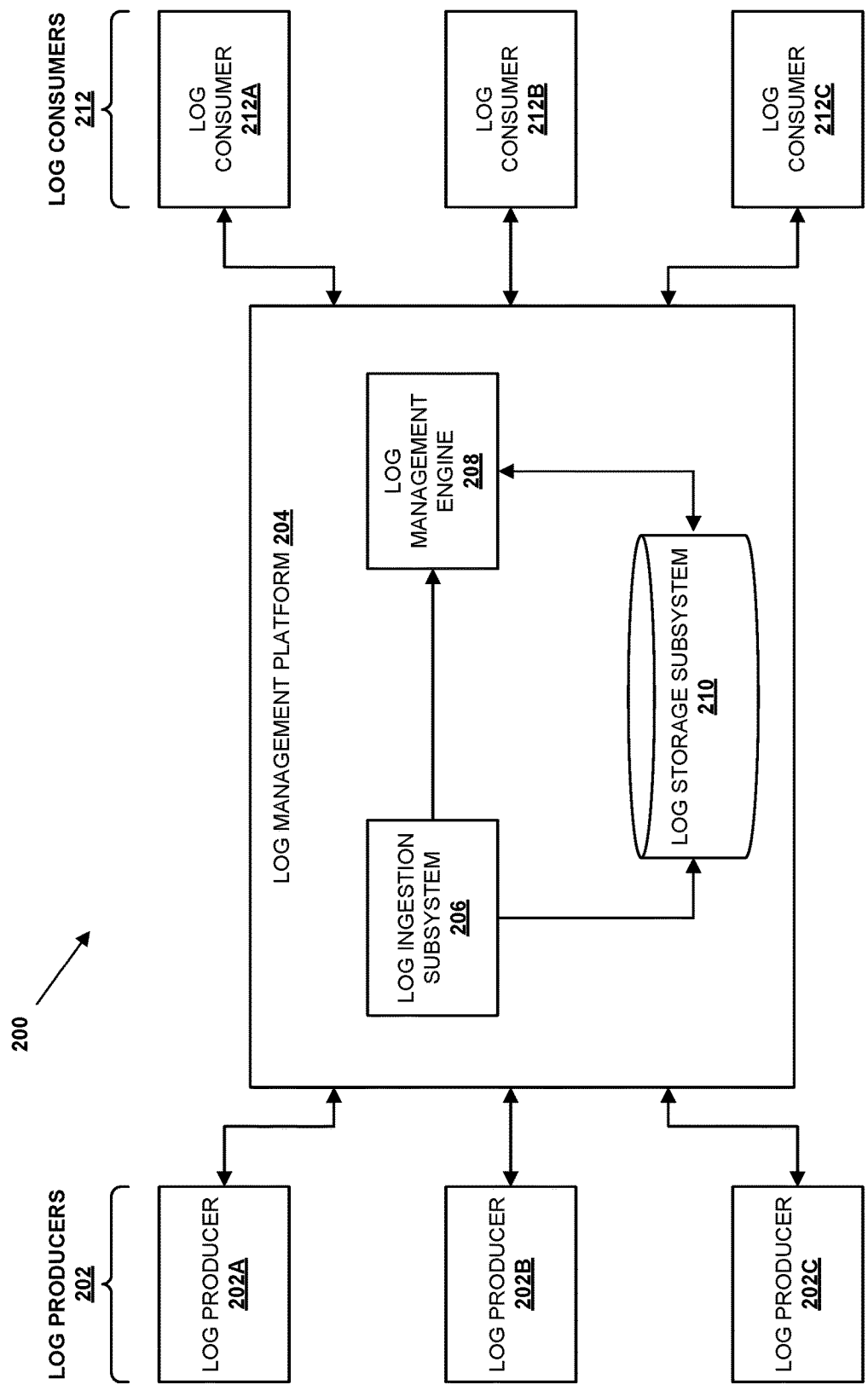
FIG. 2 illustrates an example network environment in which the disclosed technology for determining the identities of log entries and handling log entries having certain identities may be implemented, in accordance with the present disclosure.

As noted above, it is becoming increasingly common for software running on computing devices and systems to generate log data, which typically takes the form of a sequence of log entries that each records some event of interest that is detected by the software. For instance, a client application running on a client device (e.g., a mobile application, desktop application, web application, or the like) may generate log data to record events of interest that are detected during runtime sessions of the client application. Likewise, a server application running on a server (e.g., a back-end service such as a microservice) may generate log data to record events of interest that are detected during runtime sessions of the server application. Other types of software components may be configured to generate log data as well, including operating systems of computing devices and/or firmware of networking devices such as routers, switches, and gateways, among other possibilities.

In practice, an organization may deploy or otherwise have responsibility for many different software components that generate log data, such as many different instances of a client application provided by the organization and/or many different instances of server applications running in the organization's back-end platform, and in order to make use of the log data produced by these disparate software components, the organization may operate a centralized "log management platform" that functions to collect, aggregate, and store log data from various different producers of log data (referred to herein as "log producers") so that the log data can later be accessed and reviewed. For instance, after a log management platform collects, aggregates, and stores log data from different log producers, individuals associated with the organization (e.g., developers, engineers, analysts) can review the stored log data in order to gain visibility into the behavior of the software components and/or the computing devices installed with the software components.

This approach of collecting, aggregating, and storing log data from various different log producers at a centralized log management platform may provide various benefits, including providing an organization with a single platform for accessing and reviewing log data that is relevant to the organization, which improves efficiency, and perhaps also enabling the organization to gain deeper insights about the behavior of its software through analysis of a larger sample size of log data produced by multiple different instances of the same types of software components, among other possible benefits.

However, as the volume of log data that is collected, aggregated, and stored by such a centralized log management platform continues to grow, certain problems may arise. For instance, as the volume of log data that is collected, aggregated, and stored by a centralized log management platform grows, this may increase the bandwidth required to deliver the log data to the centralized log management platform, the processing power required to ingest, aggregate, and process the log data, and/or the storage capacity required to store the log data, which may in turn increase the cost of the centralized log management platform and may eventually make it impractical or infeasible for an organization to continue operating the centralized log management platform. Additionally, as the volume of log data that is collected, aggregated, and stored by a centralized log management platform grows, this may degrade certain aspects of the centralized management platform's performance, such as by increasing the time it takes to access log data that is stored at the centralized management platform when processing read requests, queries, or the like, which may in turn degrade user experience and/or introduce undesirable delay into functionality that relies on accessing log data, such as alerting functionality. The growth of log data being collected, aggregated, and stored by a centralized log management platform may present various other challenges for the centralized log management platform as well.

These foregoing problems are compounded by the fact that a large percentage of the log data being produced by log producers tends to have limited value. For instance, the log data that is produced by a log producer could be comprised of log entries that is highly repetitive, record events that have limited relevance (e.g., routine events that occur during the operation of software applications), and/or contain unintelligible information, among other possible factors that limit the value of log entries.

In view of the foregoing, it would be desirable to configure a centralized log management platform to make intelligent storage handling decisions with respect to the log data that is collected and aggregated by the centralized log management platform, so that higher-value log data can be handled differently than lower-value log data. However, there are several technical challenges that make it difficult for a centralized log management platform to accomplish this goal. First, the value of log entries that are produced by log producers tend to widely vary—some log entries may have little or no value, other log entries may have only intermediate value, and still other log entries may have high value—but this value information is not encoded into the log entries that are received from log producers and it is difficult to assess the value of produced log entries in an accurate and efficient manner. Second, the log entries that are produced by log producers tend to have a wide range of different formats, only some of which follow structured formatting patterns, and a centralized log management platform typically has no awareness of the log-entry formats being utilized by the log producers from which log entries are being collected, which further increases the difficulty of assessing the value of the log entries that are received from log producers. Third, because a centralized log management platform is typically tasked with handling large volumes of log data produced by a wide range of different log producers, the centralized log management platform generally needs to be capable of making storage handling decisions for incoming log data in a relatively quick and efficient manner, because otherwise, the centralized log management platform could start to become a bottleneck for higher-value log data that should be stored and made available for consumption in a timely manner. For these and other reasons, there remains a need for technology that enables a centralized log management platform to make intelligent storage handling decisions with respect to the log data that is collected and aggregated by the centralized log management platform.

To address these and other problems, disclosed herein is new technology for intelligently managing log data that is produced by log producers. One aspect of the disclosed technology takes the form of a new functional subsystem of a log management platform referred to herein as a "log managing engine," which is configured to carry out log identification functionality on log entries received by the log management platform in order to determine a respective "log identity" for each such log entry that corresponds to the log entry's syntax. As described in further detail below, this identification functionality may involve (i) receiving a log entry containing one or more data elements that are each expressed in either a structured format or an unstructured format, (ii) translating the log entry into a sequence of one or more tokens (or sometimes referred to as "tags") that are representative of the one or more data elements contained within the log entry, which may at times be referred to herein as a "restructured representation" of the log entry, and (iii) determining the log identity of the log entry by producing a hash (or the like) of the log entry's restructured representation.

To help illustrate the disclosed identification functionality, FIG. 1 shows a table that includes a listing of some representative examples of log entries that may be received by the disclosed log management engine, and then for each respective log entry, shows (i) a restructured representation of the respective log entry that may be produced by the disclosed log management engine and (ii) a log identity of the respective log entry that may be determined by the disclosed log management engine producing a hash of the respective log entry's restructured representation.

As demonstrated by FIG. 1, log entries that have the same syntax will generally be translated into the same restructured representation, and will thus be assigned the same log identity. For example, because the first and second log entries in the example listing of FIG. 1 are both composed of a sequence of key-value pairs having the same arrangement of keys—namely, key-value pairs with a "level" key, a "ts" key, and a "logger" key, in that order—those log entries are translated into the same restructured representation of [LogLevel][TimeStamp][Logger] and are assigned the same log identifier of 33ywclaaHOBvXpxMogdezEXOFrLUI8B7UTWJqcT182g. As another example, because the fifth and sixth log entries in the example listing of FIG. 1 are both composed of string that comprises the same sequence of unstructured data elements—namely, an IP address, a timestamp, and a network call, in that order—those log entries are translated into the same restructured representation of[IPAddress][TimeStamp][Network] and are assigned the same log identifier of awmLfAZmUrOkus XsfzOmt7RrtuFFaW-Ly8QCalcvr4. As yet another example, because the seventh and eighth log entries in the example listing of FIG. 1 are both composed of string that comprises the same sequence of unstructured data elements—namely, a string of "Processing items for bucket" followed by a numeric value—those log entries are translated into the same restructured representation of["Processing itemsfor bucket"][Number] and are assigned the same log identifier of IOnnLIGFOVQJVvFgHUhHbTTPI9nLj4TDRzYsKvsq5B0. On the other hand, log entries that have different syntax from one another will generally be translated into different restructured representations, and will thus be assigned different log identities—as demonstrated by the other representative log entries in the example listing of FIG. 1.

The disclosed log identification functionality is described in further detail below.

In accordance with the present disclosure, the log management engine may utilize the disclosed log identification functionality to classify log entries based on their syntax and then use this log classification for various purposes. For instance, as one possibility, the log management engine may carry out the log identification functionality in order to determine the log identities of a given collection of log entries for the purpose of performing some analysis that informs the future handling of log entries, which may involve clustering the given collection of log entries based on the determined log identities. As another possibility, the log management engine may carry out the log identification functionality in order to determine the log identities of log entries that are received by the log management platform for the purpose of determining whether and to what extent the received log entries are to be stored at the log management platform, which may involve the application of certain "identity-based handling rules" that define particular storage handling actions to be taken on log entries having certain log identities. As yet another possibility, the log management engine may carry out the log identification functionality in order to facilitate an analysis of software behavior at a given log producer. As still another possibility, the log management engine may carry out the log identification functionality in order to facilitate an analysis of an alert that has been triggered based on log data. As yet a further possibility, the log management engine may carry out the log identification functionality in order to facilitate the creation of improved dashboard queries that are based on log data. The disclosed log identification functionality may be carried out by the log management engine at various other times and/or for various other purposes as well.

Another aspect of the disclosed technology takes the form of a "log management agent," which is a software component that may be installed at a log producer and may be configured to carry out the disclosed log identification functionality on log entries produced by the log producer in order to determine a respective "log identity" for each such log entry that corresponds to the log entry's syntax. In this respect, as with the log management engine, a log management agent may utilize the disclosed log identification functionality to classify log entries based on their syntax and then use this log classification for various purposes. For instance, as one possibility, the log management agent may carry out the log identification functionality in order to determine the log identities of the log entries produced by the log producer for purposes of determining whether and to what extent the log entries produced by the log producer 202 are to be transmitted to the log management platform. As another possibility, the log management agent may carry out the log identification functionality in order to facilitate an analysis of software behavior at the log producer at which the log management agent is installed. The disclosed log identification functionality may be carried out by a log management agent at various other times and/or for various other purposes as well.

Advantageously, the disclosed technology may provide various improvements to existing log management platforms. For instance, the disclosed technology enables a log management platform to quickly and accurately classify log entries based on their syntax, which addresses the aforementioned technical challenges associated with intelligently handling log entries having varied, unknown formats. Further, the disclosed technology enables a log management platform to make more intelligent storage handling decisions based on the determined log identities, such as by blocking, sampling, compressing, and/or offloading log entries having log identities that are considered to provide lesser value, which may reduce the volume of log data that is stored by the log management platform (or at least reduce the volume of log data that is stored in higher storage tiers) and thereby reduce the cost and/or improve the performance of the log management platform. Further yet, the disclosed technology provides the ability to make intelligent decisions based on the determined log identities at a log producer before log data is even transmitted to a log management platform, which not only reduces the volume of log data that is stored by the log management platform but also has the additional benefit of reducing the volume of log data that is transmitted to the log management platform in the first place, thereby reducing transmission costs. The disclosed technology may provide various other improvements to existing log management platforms as well.

Turning now to FIG. 2, an example network environment 200 in which the disclosed technology for determining and using log identities of log entries may be implemented is shown. As shown in FIG. 2, the network environment 200 may include a number of log producers 202, of which three representative log producers 202A, 202B, and 202C are shown as examples. As further shown in FIG. 2, the network environment 200 may also include a log management platform 204, which may comprise various functional subsystems that are each configured to perform certain functions related to the management of log data, examples of which may include a log ingestion subsystem 206, a log management engine 208, and a log storage subsystem 210, among other possible functional subsystems. As yet further shown in FIG. 2, the network environment 200 may include a number of log consumers 212, of which three representative log consumers 212A, 212B, and 212C are shown as examples.

In general, each of the log producers 202 may comprise a computing device installed with a software component that is configured to produce log data and transmit the log data to the log management platform 204. Such a log producer 202 may take any of various forms. As one example, a given log producer 202 may take the form of a client device (e.g., a smartphone, a tablet, a laptop, a desktop computer, or the like) installed with a client application that is configured to produce and transmit log data (e.g., a mobile application, desktop application, web application, or the like). As another example, a given log producer 202 may take the form of a server installed with a server application that is configured to produce and transmit log data (e.g., a back-end service such as a microservice). A given log producer 202 may take other forms as well, including but not limited to the possibility that a given log producer 202 may comprise a computing device that is installed with multiple different software components that are each separately configured to produce and transmit log data (e.g., a client device installed with multiple different client applications or a server installed with multiple server applications).

It should also be understood that the log producers 202 that are configured to transmit log data to the log management platform 204 could either be of the same type or could be of different types. For instance, in some implementations, all of the log producers 202 that are configured to transmit log data to the log management platform 204 may comprise instances of the same type of software application running on different computing devices, such as instances of the same client application running on different client devices or instances of the same server application running on different back-end servers. In other implementations, the log producers 202 that are configured to transmit log data to the log management platform 204 may comprise a collection of different types of software applications running on different computing devices, such as a collection of multiple types of client applications, multiple types of server applications, or a combination of client and server applications. To illustrate with one example, the log producer 202A and the log producer 202B could both comprise client devices installed with instances of a given client application that is configured to produce and transmit log data, whereas the log producer 202C could comprise a back-end server installed with a given server application that is configured to produce and transmit log data. Or to illustrate with another example, the log producer 202A could comprise a client device installed with an instance of a given client application that is configured to produce and transmit log data, the log producer 202B could comprise a back-end server installed with a first server application that is configured to produce and transmit log data, and the log producer 202C could comprise a back-end server installed with a second server application that is configured to produce and transmit log data. Many other examples of the log producers 202 that are configured to transmit log data to the log management platform 204 are possible as well.

Further, in practice, the log data may take various forms, including a time sequence of discrete log entries each comprising one or more forms of data elements, such as (i) structured data elements, (ii) semi-structured data elements, and/or (iii) unstructured data elements, as previously described.

Further yet, in practice, each of the log producers 202 may transmit the log data to the log management platform 204 over a respective communication path. Each of these respective communication paths may generally comprise one or more data networks and/or data links, which may take any of various forms. For instance, each respective communication path between a log producer 202 and the log management platform 204 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

As described in further detail below, in some implementations, each of the log producers 202 may optionally be installed with a log management agent that is configured to analyze the produced log data in accordance with the present disclosure for purposes of determining whether and to what extent the log data is to be transmitted to the log management platform 204, which may involve carrying out the disclosed log identification functionality for each produced log entry. The functionality of this log management agent will be described in further detail below.

Turning to the log management platform 204, as described above, the log management platform 204 may comprise the log ingestion subsystem 206, the log storage subsystem 210, and the log management engine 208, among other possibilities, and each of these functional subsystems may be configured to carry out certain back-end functionality of the log management platform 204 in accordance with the present disclosure.

For instance, the log ingestion subsystem 206 may generally be configured to (i) receive log data from the log producers 202, (ii) perform certain pre-processing operations on the received information (e.g., validation, cleansing, deduplication, filtering, aggregation, summarization, enrichment, restructuring, reformatting, translation, mapping, etc.), and then (iii) write the received log data (and/or other data derived therefrom such as metrics data) to the log storage subsystem 210 and/or provide the received log data to the log management engine 208 for further analysis and handling, among other possible functions carried out by the log ingestion subsystem 206.

Further, the log management engine 208 of the log management platform 204 may generally be configured to (i) receive log data from the log ingestion subsystem 206, (ii) analyze the received log data for purposes of determining whether and to what extent the received log data is to be stored, which may involve carrying out the disclosed log identification functionality for each received log entry and then making a handling decision for each receive log entry based on its assigned identity, and then (iii) cause at least a portion of the received log data (and/or other data derived therefrom such as metrics data) to be written to the log storage subsystem 210, among other possible functions carried out by the log management engine 208. The functionality of the log management engine 208 will be described in further detail below.

Further yet, the log storage subsystem 210 may generally be configured to store log data that is received by the log management platform 204. In practice, the log storage subsystem 210 may comprise a set of one or more data stores that are configured to store log data, where each such data store could take any of various forms, examples of which may include a relational database (e.g., an Online Transactional Processing (OLTP) database), a NoSQL database (e.g., columnar databases, document databases, key-value databases, graph databases, etc.), a file-based data store (e.g., Hadoop Distributed File System), an object-based data store (e.g., Amazon S3, Azure Blob, etc.), a data warehouse (which could be based on one or more of the foregoing types of data stores), a data lake (which could be based on one or more of the foregoing types of data stores), a message queue, and/or a streaming event queue, among other possibilities.

Further, in at least some implementations, the log storage subsystem 210 may take the form of a multi-tier storage architecture (or sometimes referred to as a "tiered" storage architecture) comprising multiple different tiers of data stores that are designed to store different classes of log data. For instance, as one possibility, the log storage subsystem 210 may take the form of a multi-tier storage architecture comprising two tiers of data stores: (i) a first tier of one or more data stores that are designed to store log data that is more frequently accessed and/or considered to be of greater importance, which is sometimes referred to as a "hot tier" of data storage, and (ii) a second tier of one or more data stores that are designed to store log data that is less frequently accessed and/or considered to be of lesser importance, which is sometimes referred to as a "cold tier" of data storage. In this respect, the data stores in the first tier may have characteristics better suited for storage of log data that is more frequently accessed and/or considered to be of greater importance, such as a data store that has a higher level of performance (e.g., lower latency, higher throughput, and/or greater availability, among other possible aspects of a data store's performance) and/or a lower access cost as compared to the data stores that may be used for the second storage tier but has a higher storage cost than the data stores that may be used for the second storage tier, whereas the data stores in the second tier may have characteristics better suited for storage of log data that is less frequently accessed and/or considered to be of lesser importance, such as a data store that has a lower storage cost than the data stores that may be used for the first storage tier but perhaps has a lower level of performance (e.g., higher latency, lower throughput, and/or lesser availability, among other possible aspects of a data store's performance) and/or a higher access cost as compared to the data stores that may be used for the first storage tier, among other possible distinctions between the data stores in the first and second storage tiers.

As another possibility, the log storage subsystem 210 may take the form of a multi-tier storage architecture comprising three or more tiers of data stores, where each such tier is designed to store log data having a different level of access frequency and/or a different level of importance. For instance, in line with the discussion above, the data stores in higher tiers may generally have characteristics better suited for storage of log data that is more frequently accessed and/or considered to be of greater importance, such as data stores having a higher level of performance and/or a lower access cost but a higher storage cost, whereas the data stores in lower tiers may generally have characteristics better suited for storage of log data that is less frequently accessed and/or considered to be of lesser importance, such as data stores having a lower storage cost but a lower level of performance and/or a higher access cost. Some representative examples of multi-tier storage architectures having three or more storage tiers include those employed by cloud-based storage services such as Amazon Web Services (AWS) (e.g., multiple different S3 tiers), Google Cloud (e.g., standard, nearline, coldline, and archive tiers), and Microsoft Azure (e.g., hot, cool, and archive tiers), but it will be understood that a multi-tier storage architecture having three or more storage tiers may take various other forms as well. The log management platform 204 may comprise various other functional subsystems and take various other forms as well.

In practice, the log management platform 204 may comprise some set of physical computing resources (e.g., processors, data storage, etc.) utilized to implement the foregoing functional subsystems. This set of physical computing resources may take any of various forms. As one possibility, the log management platform 204 may comprise cloud computing resources supplied by a third-party provider of "on demand" cloud computing resources, such as Amazon Web Services (AWS), Amazon Lambda, Google Cloud, Microsoft Azure, or the like. As another possibility, the log management platform 204 may comprise "on-premises" computing resources of the given software provider (e.g., servers owned by the given software provider). As yet another possibility, the log management platform 204 may comprise a combination of cloud computing resources and on-premises computing resources. Other implementations of the log management platform 204 are possible as well.

Further, in practice, the functional subsystems of the example log management platform 204 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning now to the log consumers 212, each of the log consumers 212 may comprise a computing device installed with a software component that is configured to consume log data from the log management platform 204. Such a log consumer 212 may take any of various forms. As one example, a given log consumer 212 may take the form of a server installed with a server application (e.g., a back-end service such as a microservice) that is configured to request and receive log data from the log management platform 204. Such a server application could take any of various forms, examples of which may include a back-end service that drives a client-side application for presenting log data or a back-end service that analyzes log data for purposes of determining whether to issue alerts, among other possible server applications that may be configured to consume log data from the log management platform 204. Further, in practice, such a server application either could be hosted by the same organization that hosts the log management platform 204, in which case the server application may request and receive the log data via an internal Application Programming Interface (API) (or the like) of the organization, or could be hosted by a different organization than the one that hosts the log management platform 204, in which case the server application may request and receive the log data via an external API (or the like) of the organization hosting the log management platform 204, among various other possibilities. As another example, a given log consumer 212 may take the form of a client device installed with a client application that is configured to request and receive log data from the log management platform 204 via an external API (or the like) of the organization hosting the log management platform 204. A given log consumer 212 may take other forms as well.

Further, each of the log consumers 212 may be configured to communicate with the log management platform 204 over a respective communication path that may take a similar form to the respective communication paths between the log producers 202 and the log management platform 204.

As noted above, in accordance with the present disclosure, the log management engine 208 (and perhaps also log management agents) may be configured to carry out log identification functionality for received log entries that results in the determination of a respective identity for each such log entry. This log identification functionality may take any of various forms.

Figure 3:
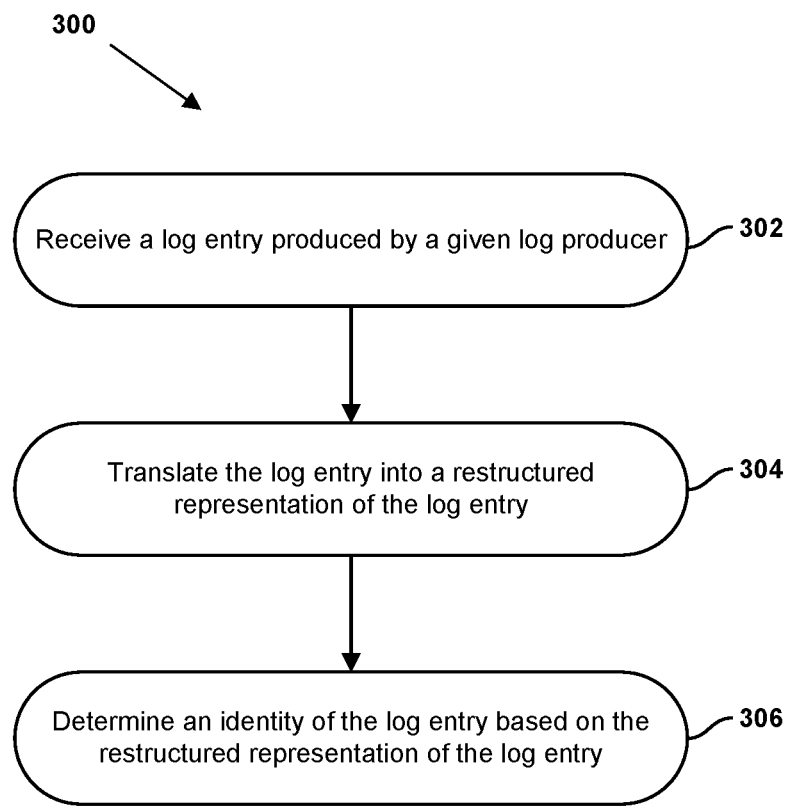
FIG. 3 illustrates a flow diagram showing one possible example of log identification functionality that may be carried out by a log management engine in order to determine an identity for a log entry, in accordance with the present disclosure.

FIG. 3 illustrates a flow diagram 300 showing one possible example of the log identification functionality that may be carried out by the log management engine 208 in order to determine an identity for a log entry, in accordance with the present disclosure.

As shown in FIG. 3, the example log identification functionality may begin at block 302 with the log management engine 208 receiving a given log entry that was produced by a given log producer 202. In line with the discussion above, the given log producer 202 could take any of various forms, examples of which may include a client device installed with a client application that is configured to produce and transmit log data or a server installed with a server application that is configured to produce and transmit log data, among other possibilities.

Further, the given log entry may be received by the log management engine 208 over any of various communication paths. For instance, as one possibility, the given log entry may be included in a batch of log entries that are sent from the given log producer 202 to the log management platform 204, ingested by the log ingestion subsystem 206, and then passed from the log ingestion subsystem 206 to the log management engine 208. As another possibility, the log entry may be included in a batch of log entries that are sent from the given log producer 202 to the log management platform 204, ingested by the log ingestion subsystem 206, and then written to the log storage subsystem 210 in a given storage location (e.g., a data store configured to temporarily store ingested log data) that is accessible by the log management engine 208 such that the log management engine 208 may receive the given log entry by retrieving it from the log storage subsystem 210. The given log entry may be received by the log management engine 208 over various other communication paths as well.

Further yet, in line with the discussion above, the given log entry may take various forms. For instance, at a high level, the given log entry may comprise a payload that provides information about some event that was recorded by the given log producer 202, where that payload may be composed of one or more data elements that are each expressed in either (i) a structured format that delineates and identifies the type of data element and the corresponding value of the data element, such as a key-value pair or (ii) an unstructured format, such as a raw string of alphanumeric characters. For instance, as one possibility, the given log entry's payload may be composed entirely of data elements expressed in a structured format, such as a JSON format comprising a sequence of key-value pairs. As another possibility, the given log entry's payload may be composed entirely of data elements expressed in an unstructured format, such as a single alphameric value or a sequence of distinct alphameric values that are concatenated together in some manner. As yet another possibility, the given log entry's payload may be composed of a mixture of data elements expressed in a structured format and data elements expressed in an unstructured format. The given log entry may take other forms as well.

Turning now to FIG. 4A, some illustrative examples of log entries that may be received by the log management engine 208 are shown, in accordance with the present disclosure.

For instance, FIG. 4A shows a first illustrative log entry 402A comprising a payload of {"level": "info", "ts": "1658187879.58879", "logger": "aeproxy" } which is an example of a log entry composed entirely of data elements expressed in a structured format. In particular, the payload of the first illustrative log entry 402A comprises a sequence of key-value pairs that are arranged in a JSON format in which the key-value pairs are concatenated together and separate by commas and each respective key-value comprises a key within quotations followed by a color and then a corresponding value within quotations. However, it should be understood that the formatting of the first illustrative log entry 402A is merely one possible way that a log entry composed entirely of data elements expressed in a structured format may be packaged and formatted, and other possibilities may also exist.

Further, FIG. 4A shows a second illustrative log entry 402B comprising a payload of 10.42.83.72-[19698.28151]-"GET/api/v1/query_range?end=2", which is an example of a log entry composed entirely of data elements expressed in an unstructured format. In particular, the payload of this second illustrative log entry 402B comprises at least three discrete data elements that are expressed in an unstructured format, which are 10.42.83.72, [19698.28151], and "GET/api/v1/query_range?end=2", and as discussed below, the log management engine 208 may parse each of these as a separate data element.

Further yet, FIG. 4A shows a third illustrative log entry 402C comprising a payload of Failed to send record to elasticsearch, which is another example of a log entry composed entirely of data elements expressed in an unstructured format. In particular, the payload of this third illustrative log entry 402C comprises a single data element expressed in an unstructured format, which is the string "Failed to send record to elasticsearch," and as discussed below, the log management engine 208 may parse this as a single data element.

Still further, FIG. 4A shows a fourth illustrative log entry 402D comprising a payload of Processing itemsfor bucket 1066, which is yet another example of a log entry composed entirely of data elements expressed in an unstructured format. In particular, the payload of this fourth illustrative log entry 402D comprises two data elements expressed in an unstructured format, which are the string "Processing items for bucket" followed by the number 1066, and as discussed below, the log management engine 208 may parse this as two data elements.

Lastly, FIG. 4A shows a fifth illustrative log entry 402E comprising a payload of 10.23.46.27-{"k8s_arch": "arm64", "service_instance": "production" }, which is an example of a log entry composed of a mixture of data elements expressed in a structured format and data elements expressed in an unstructured format. In particular, the payload of the fifth illustrative log entry 402E begins with 10.23.46.27, single data element expressed in an unstructured format, and is then followed by a sequence of key-value pairs that are arranged in a JSON format.

The log entries that are received by the log management platform 208 may take a number of other forms as well.

Returning now to FIG. 3, at block 304, the log management engine 208 may translate the given log entry into a sequence of one or more tokens that are representative of the one or more data elements contained within the given log entry, which as noted above may at times be referred to herein as a "restructured representation" of the given log entry. At a high level, this function of translating the given log entry into a restructured representation may involve reconstructing object and sequence structure from nested and repeated data, extracting type-inferred data, and producing a representation that distinguishes between structure, type-inferred data, and "fixed text" (i.e., the remaining portions of the given log entry) using respective tokens, among other possible operations.

According to one possible implementation, this function of translating the given log entry into a restructured representation of the given log entry may involve two separate phases: (i) a first phase during which the log management engine 208 parses any data elements within the given log entry that are expressed in a structured format and (ii) a second phase during which the log management engine 208 parses any data elements within the given log entry that are expressed in an unstructured format. Each of these phases may take various forms.

Beginning with the first phase, the function of parsing any data elements within the given log entry that are expressed in a structured format may involve (i) identifying each data element within the given log entry that is expressed in a structured format, such as each data element expressed as a key-value pair, and then (ii) translating each identified data element into a token that is representative of the identified data element, which may take the form of a data element that represents the identified data element's type (i.e., the key of a key-value pair) or a data element that represents of the identified data element's underlying value (i.e., the value of a key-value pair), among other possibilities. To illustrate with an example, if the log management engine 208 identifies a key-value pair having a key of "level" and a value of "info", the log management engine 208 could translate that key-value pair into a token comprising either a representation of the key (e.g., "LEVEL") or a representation of the value (e.g., "INFO"), among other possibilities. In this respect, the decision of whether to translate a key-value pair (or other data element expressed in a structured format) into a token that represents the key of the key-value pair or a token that represents the value of the key-value pair may depend on the particular type of key-value pair at issue—for some types of key-value pairs, it may be preferable to represent such key-value pairs more generally in terms of their keys, which may result in the same identity being assigned to log entries containing the type of key-value pair regardless of which specific value they contain for the key-value pair, whereas for other types of key-value pairs, it may be preferable to represent such key-value pairs more specifically in terms of their value, which may result in different identities being assigned to log entries containing different values for the key-value pair.

Turning next to the second phase, the function of parsing any data elements within the given log entry that are expressed in an unstructured format may involve iteratively applying a set of parser functions (or sometimes referred to as "matcher" functions) to any portion(s) of the given log entry are expressed in unstructured format, where each such parser function is configured to (i) search the unstructured portion(s) of the given log entry for a respective type of pattern that is indicative of a known type of data element, and (ii) if any unstructured portion of the given log entry matches the respective type of pattern such that the matched portion of the given log entry is inferred to be a data element of the known type, translate the matched portion of given log entry into a token that represents either the inferred type of the matched portion or the underlying value of the matched portion. In this respect, the set of parser functions may comprise parser functions that are configured to search for patterns indicative of certain types of data elements that are likely to be inserted by log producers 202 programmatically, such as time values (e.g., timestamps), IP addresses, certain types of numeric codes (e.g., HTTP codes), general numeric values, network calls (e.g., textual strings formatted according to HTTP methods such as GET, POST, etc.), log levels, and/or other textual values of interest, among various other possible types of data elements for which parser functions may be applied.

To illustrate with an example, if an unstructured portion of the given log entry that comprises the raw string "10.42.83.72" and the log management engine 208 is configured to apply a parser function for IP addresses, the log management engine 208 may identify that unstructured portion of the given log entry as an IP address and then translate it into a token comprising either a representation of the matched portion's inferred type (e.g., "IPADDRESS") or a representation of the matched portion's underlying value (e.g., "10.42.83.72" or perhaps a generalized version thereof such as "10.42.XX.XX"), among other possibilities. In this respect, the decision of whether a parser function is to translate an unstructured portion of the given log entry that matches a given pattern into a token that represents the inferred type of the matched portion or a token that represents the underlying value of the matched portion may depend on the particular type of data element—for some types of data elements, it may be preferable to represent such data elements more generally in terms of their inferred types, which may result in the same identity being assigned to log entries containing the same type of data element regardless of the data element's underlying value, whereas for other types of data elements, it may be preferable to represent such data elements more specifically in terms of their value, which may result in different identities being assigned to log entries containing data elements that are inferred to have the same type but have different underlying values.

Further, the set of parser functions will preferably be ordered in way that gives to higher precedence to parser functions for more specific types of data elements than to parser functions for more general types of data elements such that the parser functions for more specific types of data elements will be applied before the parser functions for more general types of data elements. For instance, if the set of parser functions includes parser functions for specific types of numeric values (e.g., time values, IP addresses, or the like) as well as parser functions for more general types of numeric values (e.g., hexadecimal integers, octal integers, decimal integers, etc.), the set of parser functions may be ordered in way that gives to higher precedence to the parser functions for the specific types of numeric values such that those parser functions will be applied prior to the parser functions for the more general types of numeric values. And along similar lines, if the set of parser functions includes parser functions for specific types of textual values (e.g., network calls) as well as parser functions for more general types of textual values, the set of parser functions may be ordered in way that gives to higher precedence to the parser functions for the specific types of textual values such that those functions will be applied prior to the parser functions for the more general types of textual values. In this way, the parsing of the data elements expressed in an unstructured format may begin by attempting to translate the unstructured portions of the given log entry into more specific types of data elements, which may improve the precision of the subsequent functionality for classifying and handling log entries based on their determined identities, and may then "fall back" to attempting to translate the unstructured portions of the given log entry into more general types of data elements, which may still enable the subsequent functionality for classifying and handling log entries based on their determined identities.

In practice, this set of parser functions could be implemented as a set of parser combinators, among various other possible implementations of the set of parser functions. Further, in practice, this set of parser functions that is applied by the log management engine may be defined in any of various manners—certain of the parser functions may be pre-programmed into the log management engine 208 prior to its deployment (e.g., based on heuristics) while other parser functions may be added to the set of parser functions that are applied by the log management engine 208 after deployment, such as new parser functions that are loaded by an admin user of the log management engine 208 via an interface and/or new parser functions that are created by the log management engine 208 based on an analysis of log data, dashboard queries, alert queries, or the like, among other possibilities. To illustrate with an example, if a dashboard or alert query is configured to derive metrics that indicate the volume of log entries containing different HTTP response status codes (e.g., 200, 403, etc.), the log management engine 208 may use such a query as a basis for creating new parser functions that translates each different HTTP status code into a different token, so that log entries containing HTTP status codes are classified in a more granular matter. Along similar lines, certain of the pre-programmed parser functions could be disabled and/or modified by the log management engine 208 based on input from an admin user and/or analysis by the log management engine 208. The set of parser functions may take various other forms and be defined in various other manners as well.

After applying the set of parser functions, it is also possible that one or more unstructured portions of the given log entry may not match any of the patterns being searched by the parser functions. As such, as part of the second phase, the log management engine 208 may also function to translate any such unstructured portion into a corresponding token that represents that unmatched portion of the given log entry, such as a token comprising the unmatched portion's raw sequence of characters, among other possibilities.

Further, in a scenario where the log management engine 208 identified (and translated) data elements in the given log entry expressed in a structured format during the first phase, the log management engine 208 may also optionally be configured to recursively apply the two-phase process described above to one or more of those identified data elements expressed in a structured format in order to further parse the value of such a structured data element. For example, the log management engine 208 may recursively carry out the two-phase process described above on a value of an identified key-value pair by (i) searching the value of the identified key-value pair for other nested key-value pairs and translating any such nested key-value pair into a respective token that is representative of the nested key-value pair data element, and then (ii) applying the set of parser functions to the value of the identified key-value pair in order to search the value of the identified key-value pair for respective types of pattern that are indicative of known types of data element and translating any matched portion of the identified key-value pair's value into a token that represents either the inferred type of the matched portion or the underlying value of the matched portion. In this respect, if any portion of the value of the identified key-value pair is translated into a token, then the identified key-value pair may be replaced by a sequence of two or more tokens that are representative of nested portions of the key-value pair's value rather than a single token that is representative of the identified key-value pair. One representative example of a key-value pair that may be amenable to further parsing in this manner is a "message" field of a log entry's payload, which often has a value comprising a sequence of multiple discrete data elements that may each be expressed in either a structured format or an unstructured format.

In embodiments such as this where the log management engine 208 is configured to recursively apply the two-phase process described above to data elements expressed in a structured format, the log management engine 208 could either (i) recursively apply the two-phase process to the value of every structured data element that is identified, regardless of whether the structured data element appears to be amenable to further parsing, or (ii) perform an initial assessment of whether the structured data elements that are identified are amenable to further parsing (e.g., based on the type of key or the structure of the value) and then recursively apply the two-phase process to the value of any structured data element that appears to be amenable to further parsing, among other possibilities.

As a result of carrying out the process described above, each structured data element in the given log entry (e.g., each key-value pair) may be translated into a corresponding token that represents the structured data element, and each unstructured data element of the given log entry may be translated into a corresponding token that represents the unstructured data element, thereby resulting in a sequence of one or more tokens that represent the one or more data elements included in the given log entry.

In the foregoing implementation, the log management engine 208 may be configured to carry out these two separate phases either in series (e.g., by starting with the first phase and then carrying out the second phase after the first phase has concluded) or in parallel (e.g., by starting with the first phase but then commencing the second phase before the first phase has concluded), among other possibilities.

Further, the function of translating the given log entry into a restructured representation of the given log entry may take various other forms as well—including but not limited to the possibility that the function may involve a single phase during which parsing of both structured data elements and unstructured data elements is carried out.

Figure 4B:
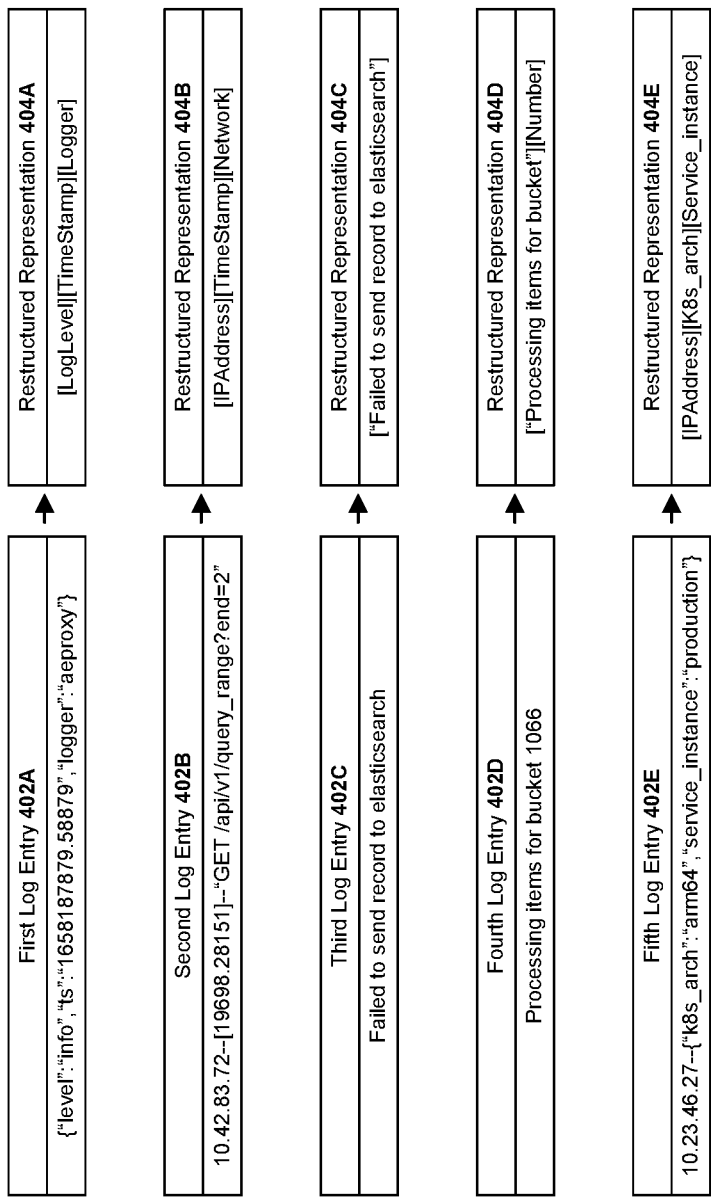
FIG. 4B illustrates one possible example of how a log management engine may translate each of the log entries of FIG. 4A into a restructured representation of the log entry, in accordance with the present disclosure.

To help illustrate the functionality carried out at block 304, FIG. 4B shows one possible example of how the log management engine 208 may translate each of the illustrative log entries of FIG. 4A into a restructured representation of the log entry, in accordance with the present disclosure.

Starting with the first illustrative log entry 402A that is composed entirely of structured data elements in the form of key-value pairs, as shown, the log management engine 208 may parse and translate each such key-value pair into a corresponding token that is representative of the type of the key-value pair (i.e., the key of the key value pair). For example, the log management engine 208 may translate (i) the "level": "info" key-value pair into a token of [LogLevel], (ii) the "ts": "1658187879.58879" key-value pair into a token of [TimeStamp], and (iii) the "logger": "aeproxy" key-value pair into a token of [Logger], such that the resulting first restructured representation 404A of the first illustrative log entry 402A takes the form of [LogLevel][TimeStamp][Logger].

Along similar lines, any other log entry composed of a sequence of key-value pairs that has this same arrangement of keys—namely, key-value pairs with a "level" key, a "ts" key, and a "logger" key, in that order—will be translated into the same restructured representation of [LogLevel][TimeStamp][Logger] regardless of what values are included in the log entry for these key-value pairs.

Turning next to the second illustrative log entry 402B that is composed of data elements expressed in an unstructured format, the log management engine 208 may (i) determine that the "10.42.83.72" portion of the second illustrative log entry 402B matches a pattern that is indicative of an IP-address type of data element and translate it into a token of [IPAddress], (iii) determine that the "19698.28151" portion of the second illustrative log entry 402B matches a pattern that is indicative of a timestamp type of data element and translate it into a token of [TimeStamp], and (iii) determine that the "GET/ap/v1/query_range?end=2" portion of the second illustrative log entry 402B matches a pattern that is indicative of an network-call type of data element and translate it into a token of [Network], such that the resulting second restructured representation 404B of the second illustrative log entry 402B takes the form of [IPAddress][TimeStamp][Network].

Along similar lines, any other log entry composed of a sequence of data elements expressed in an unstructured format that has this same constitution—namely, a first portion that matches a pattern indicative of an IP-address type of data element, a second portion that matches a pattern indicative of a timestamp type of data element, and a third portion that matches a pattern indicative of a network-call type of data element, in that order—will be translated into the same restructured representation of [IPAddress][TimeStamp][Network] regardless of what underlying values are included in the log entry for these data elements.

Turning next to the third illustrative log entry 402C that is composed of a single data element expressed in an unstructured format, the log management engine 208 may not be able to match any portion of the third illustrative log entry 402C with any predefined patterns and may translate the entirety of the third illustrative log entry 402C into a corresponding token that represents the raw sequence of characters that comprise the third illustrative log entry 402C. For example, the log management engine 208 may translate the raw sequence of characters "Failed to send record to elasticsearch" into a token of ["Failed to send record to elasticsearch"], such that the third restructured rendition 404C of the third illustrative log entry 402C takes the form of ["Failed to send record to elasticsearch"].

Along similar lines, any other log entry composed of a raw sequence of characters that does not match any predefined patterns may be translated into a restructured representation comprising a single token that represents the raw sequence of characters.

Turning next to the fourth illustrative log entry 402D that is composed of data elements expressed exclusively in an unstructured format, the log management engine 208 may (i) determine that the "Processing itemsfor bucket" portion of the fourth illustrative log entry 402D does not match any predefined patterns and may translate it into a corresponding token of ["Processing itemsfor bucket" ] that represents the raw sequence of characters "Processing items for bucket" and (ii) determine that the "1066" portion of the fourth illustrative log entry 402D matches a pattern that is indicative of a number type of data element and translate it into a token of [Number], such that the resulting fourth restructured representation 404D of the fourth illustrative log entry 402D takes the form of ["Processing itemsfor bucket"] [Number].

Along similar lines, any other log entry composed of a sequence of data elements expressed in an unstructured format that has this same constitution—namely, a first portion that does not match any predefine patterns and a second portion that matches a pattern indicative of a number type of data element, in that order—will be translated into the same restructured representation comprising a first token that represents the raw sequence of characters of the first portion and a second token of [Number], regardless of what underlying values are included in the log entry for the data element that is represented by the token [Number].

Turning lastly to the fifth illustrative log entry 402E that is composed of data elements expressed in both an unstructured format and in the form of key-value pairs, as shown, the log management engine 208 may (i) determine that the "10.23.46.27" portion of the fifth illustrative log entry 402E matches a pattern that is indicative of an IP-address type of data element and translate it into a token of[IPAddress], (ii) translate the "k8s_arch": "arm64" key-value pair into a token of[K8s_arch], and (iii) translate the "service_instance": "production" key-value pair into a token of[Service_instance], such that the resulting fifth restructured representation 404E of the fifth illustrative log entry 402E takes the form of [IPAddress][K8s_arch][Service_instance].

Along similar lines, any other log entry composed of a sequence of data elements expressed in a combination of both structured format and unstructured format that has this same constitution—namely, a first portion that matches a pattern indicative of an IP-address type of data element, followed by a key-value pair with a "k8s_arch" key and another key-value pair with a "service_instance" key, in that order—will be translated into the same restructured representation of [IPAddress][K8s_arch][Service_instance] regardless of what values are included in these data elements.

Depending on the specific implementation of the translation functionality, the restructured representations 404A-E of the illustrative log entries 402A-E that are produced by the log management engine 208 may take various other forms as well. For example, instead of translating each of the matched data elements into tokens that are representative of the types of those data elements, the log management engine 208 could be configured to translate certain of the matched data elements into tokens that are representative of the underlying values of the data elements rather than the types of the data elements.

Returning once more to FIG. 3, at block 306, the log management engine 208 may determine an identity of the given log entry based on the restructured representation of the given log entry that is produced at block 304. This function may take various forms, and in at least implementations, may involve generating a hash (or other unique identifier) of the restructured representation of the given log entry using any technique now known or later developed.

For instance, as one possible implementation, the log management engine 208 may apply a hashing function to the restructured representation of the given log entry in order to produce a hash that serves as the identity of the given log entry. Examples of such a hashing function may include secure hashing algorithms such as SHA-3, SHA-2, and SHA-1, message-digest algorithms such as MD6, MD5, and MD4, and BLAKE algorithms such as BLAKE2, among other possibilities.

In accordance with this functionality, log entries having the same restructured representation will be determined to have the same identity, whereas log entries having different restructured representations will be determined to have different identities. For instance, each time a hashing function is applied to the same restructured representation, that hashing function will produce the same hash that uniquely identifies log entries having that particular restructured representation. On the other hand, when a hashing function is applied to restructured representations that differ in any way, the hashing function will produce different hashes that serve as different log identities.

Figure 4C:
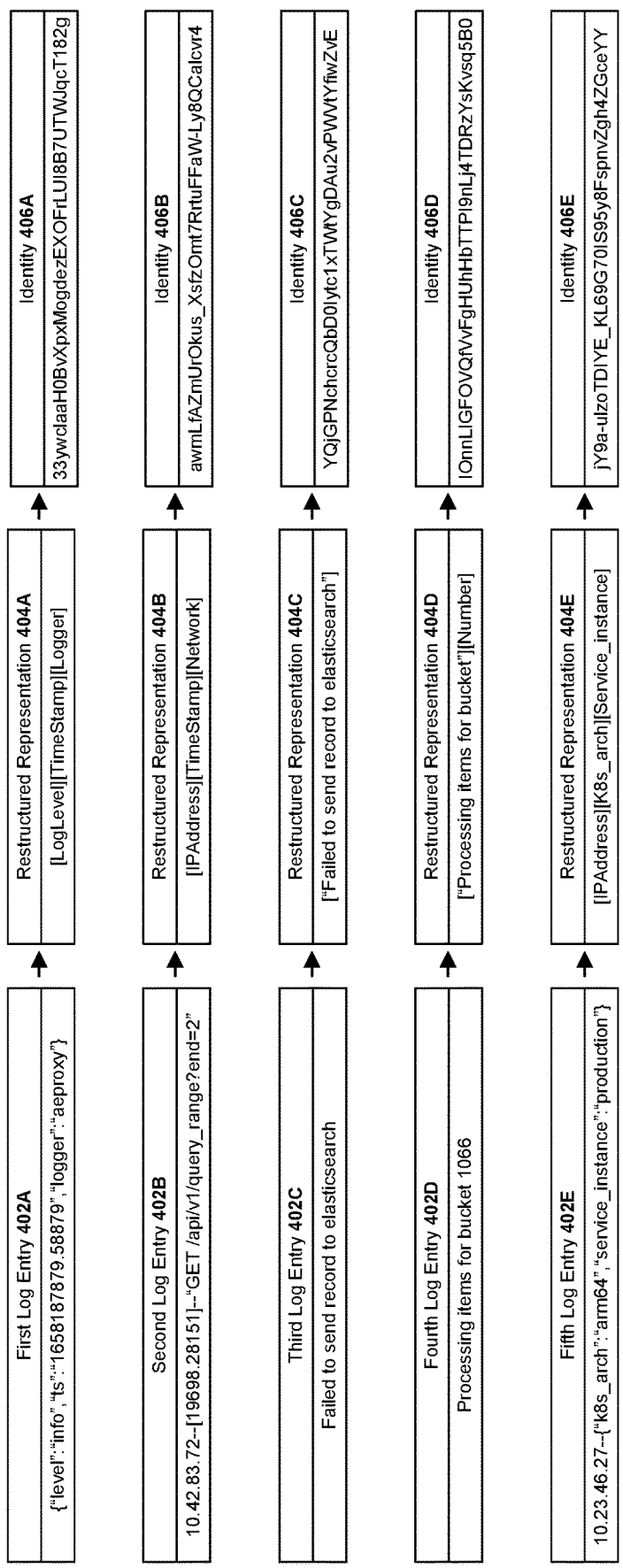
FIG. 4C illustrates one possible example of how a log management engine may produce a log identity from each of the illustrative restructured representations of FIG. 4B using an SHA-3 hashing function, in accordance with the present disclosure.

To help illustrate the functionality carried out at block 306, FIG. 4C shows one possible example of how the log management engine 208 may produce a log identity from each of the illustrative restructured representations of FIG. 4B using an SHA-3 hashing function, in accordance with the present disclosure.

Starting with the first illustrative log entry 402A, the log management engine 208 may apply an SHA-3 hashing function to the first illustrative restructured representation 404A that was produced for the first illustrative log entry 402A and thereby produce a hash having a value of 33ywclaaHOBvXpxMogdezEXOFrLUI8B7UTWJqcT182g, which may serve as a first log identity 406A of the first illustrative log entry 402A.

Along similar lines, for any other log entry is translated into the same restructured representation of [LogLevel][TimeStamp][Logger] at block 304, the SHA-3 hashing function applied by the log management engine 208 at block 306 would produce this same log identity of 33ywclaaHOBvXpxMogdezEXOFrLUI8B7UTWJqcT182g, regardless of what underlying values are included in the log entry.

Turning next to the second illustrative log entry 402B, the log management engine 208 may apply the SHA-3 hashing function to the second illustrative restructured representation 404B that was produced for the second illustrative log entry 402B and thereby produce a hash having a value of awmLfAZmUrOkus XsfzOmt7RrtuFFaW-Ly8QCalcvr4, which may serve as a second log identity 406B of the second illustrative log entry 402B.

Along similar lines, for any other log entry that is translated into the same restructured representation of [IPAddress][TimeStamp][Network] at block 304, the SHA-3 hashing function applied by the log management engine 208 at block 306 would produce this same log identity of awmLfAZmUrOkus XsfzOmt7RrtuFFaW-Ly8QCalcvr4, regardless of what underlying values are included in the log entry.

Turning next to the third illustrative log entry 402C, the log management engine 208 may apply the SHA-3 hashing function to the third illustrative restructured representation 404C that was produced for the third illustrative log entry 402C and thereby produce a hash having a value of YQjGPNchcrcQbD0Iytc1xTWtYgDAu2vPWVtYfiwZvE, which may serve as a third log identity 406C of the third illustrative log entry 402C.

Along similar lines, for any other log entry that is translated into the same restructured representation of ["Failed to send record to elasticsearch" ] at block 304, the SHA-3 hashing function applied by the log management engine 208 at block 306 would produce this same log identity of YQjGPNchcrcQbD0Iytc1xTWtYgDAu2vPWVtYfiwZvE.

Turning next to the fourth illustrative log entry 402D, the log management engine 208 may apply the SHA-3 hashing function to the fourth illustrative restructured representation 404D that was produced for the fourth illustrative log entry 402D and thereby produce a hash having a value of IOnnLIGFOVQJVvFgHUhHbTTPI9nLj4TDRzYsKvsq5B0, which may serve as a fourth log identity 406D of the fourth illustrative log entry 402D.

Along similar lines, for any other log entry that is translated into the same restructured representation of ["Processing items for bucket"][Number] at block 304, the SHA-3 hashing function applied by the log management engine 208 at block 306 would produce this same log identity of IOnnLIGFOVQJVvFgHUhHbTTPI9nLj4TDRzYsKvsq5B0, regardless of what underlying values are included in the log entry for the data element that is represented by the token [Number].

Turning lastly to the fifth illustrative log entry 402E, the log management engine 208 may apply the SHA-3 hashing function to the fifth illustrative restructured representation 404E that was produced for the fifth illustrative log entry 402E and thereby produce a hash having a value of jY9a-ulzoTDIYE_KL69G70IS95y8FspnvZgh4ZGceYY, which may serve as a fifth log identity 406E of the fifth illustrative log entry 402E.

Along similar lines, for any other log entry that is translated into the same restructured representation of [TimeStamp][K8s_arch][Service_instance] at block 304, the SHA-3 hashing function applied by the log management engine 208 at block 306 would produce this same log identity of jY9a-ulzoTDIYE_KL69G70IS95y8FspnvZgh4ZGceYY, regardless of what underlying values are included in the log entry.

Depending on the specific implementation of the hashing functionality, the log identities 406A-E of the illustrative log entries 402A-E that are determined by the log management engine 208 may take various other forms as well.

The log identification functionality that is carried out by the log management engine 208 in order to determine an identity for a log entry could take other forms as well. Further, while the log identification functionality is described above as being carried out by the log management engine 208, as noted, a log producer 202 may also optionally be installed with a log management agent that is configured to carry out the log identification functionality.

In accordance with the present disclosure, this disclosed log identification functionality may be utilized by the log management engine 208 in order to classify log entries based on their syntax and then use this log classification log identification functionality for various purposes.

For instance, as one possible use case of the disclosed log identification functionality, the log management engine 208 may engage in a "log learning" phase during which the log management engine 208 carries out the log identification functionality in order to determine the identities of a given collection of log entries for the purpose of performing some analysis that informs the future handling of log entries. In practice, the results of such an analysis could be (i) presented to a user within an interface that facilitates the creation of new rules for handling log data or (ii) utilized by the log management engine 208 to automatically create new rules for handling log data, among other possible ways that the results of such an analysis may be utilized. Details of the log learning phase of the log management engine 208 will be described in greater depth below.

As another possible use case of the disclosed log identification functionality, the log management engine 208 may engage in a "log handling" phase during which the log management engine 208 carries out the log identification functionality in order to determine the identities of log entries that are received by the log management platform 204 for the purpose of determining whether and to what extent the received log entries are to be stored. For instance, the log management engine 208 may be configured to execute certain "identity-based handling rules" for handling log entries, where each such identity-based handling rule defines a given set of one or more handling actions that are to be taken on log entries having a given log identity. The one or more handling actions that are defined by an identity-based handling rule could take any of various forms.

One possible handling action that may be defined by an identity-based handling rule for log entries having a given log identity may comprise an action of blocking log entries having the given log identity from being persistently stored in the log storage subsystem 210, which may reduce the storage footprint of log entries having the given log identity.

Another possible handling action that may be defined by an identity-based handling rule for log entries having a given log identity may comprise an action of persistently storing log entries having the given log identity in the log storage subsystem 210 in accordance with a given sampling rate for storing a reduced extent of log entries having the given log identity. For example, if the log management engine 208 were operating in accordance with an identity-based handling rule that defines a handling action specifying a sampling rate of 10% for storage of log entries having a given log identity, then the log management engine 208 may function to persistently store 10% of received log entries having the given log identity (e.g., every $10^{th}$ log entry having the given log identity) in the log storage subsystem 210 while discarding (or taking some other action such as storing in a lower tier) the other 90% of received log entries having the given log identity. Other examples of storing log entries in accordance with a given sampling rate may also exist.

Yet another possible handling action that may be defined by an identity-based handling rule for log entries having a given log identity may comprise an action of storing log entries having the given log identity in a given storage location within the log storage subsystem 210 that differs from a default storage location for storing received log entries within the log storage subsystem 210. For example, in an embodiment where the log storage subsystem 210 comprises a multi-tier storage architecture and the default storage location for storing received log entries in a highest storage tier of the multi-tier storage architecture (e.g., a "hot" tier), such a handling action may comprise an action of storing log entries having a given log identity into a lower storage tier of the multi-tier storage architecture (e.g., a "cold" tier or "archive" tier). In this respect, the storage of log data into the different storage tiers may provide different benefits and drawbacks relative to one another—data stores in a higher storage tier may generally have characteristics better suited for storage of log data that is more frequently accessed and/or considered to be of greater importance, such as data stores having a higher level of performance and/or a lower access cost but a higher storage cost, whereas data stores in a lower tier may generally have characteristics better suited for storage of log data that is less frequently accessed and/or considered to be of lesser importance, such as data stores having a lower storage cost but a lower level of performance and/or a higher access cost. As such, a handling action of storing log data into a lower storage tier may be desirable for log data that is expected to have lower access frequency and/or is otherwise not considered to be important. The storage location specified by such a handling action could take other forms as well (e.g., a particular data store rather than a storage tier).

Still another possible handling action that may be defined by an identity-based handling rule for log entries having a given log identity may comprise an action of storing log entries having the given log identity in a compressed format, which may reduce the storage footprint of such log data. For example, such a handling action may involve removing or splitting certain portions of the log entries having the given log identity prior to storage (e.g., known, fixed portions of the log entries that can be re-inserted later as needed and/or portions that are not critical to the analysis of such log entries later) and/or replacing certain portions of the log entries having the given log identity with reduced-size representations of such portions, such as reduced-size placeholder elements that allow the replaced portions of the log entries to be re-inserted later as needed, among other possible ways of compressing log entries having the given identity for purposes of storage.

A further possible handling action that may be defined by an identity-based handling rule for log entries having a given log identity may comprise an action of deriving a given type of metric based on the log entries having the given log identity and then storing the derived metric either together with or in place of the log entries having the given log identity. To illustrate with one specific example, if the given log identity serves to identify log entries containing HTTP response status codes, such a handling action may involve deriving a metric that indicates a volume of received log entries that contain a certain type of HTTP response status code (e.g., HTTP 200) and storing such a metric along with or in place of the log entries having the given log identity. Many other examples are possible as well.

Yet a further possible handling action that may be defined by an identity-based handling rule for log entries having a given log identity may comprise a "conditional" version of one of the foregoing actions that is conditioned on some value included within the log entries having the given log identity. For example, if the given log identity serves to identify log entries containing HTTP response status codes, then such a handling action may comprise a "conditional" version of one of the foregoing actions that is conditioned on a particular HTTP response status code is contained within a log entry having the given log identity (e.g., a handling action that is to be carried out if a log entry contains an HTTP 200 code specifically).

The handling actions that may be defined by an identity-based handling rule for log entries having a given log identity may take various other forms as well. Further, in line with the discussion above, an identity-based handling rule may define multiple different handling actions. To illustrate with a first example, an identity-based handling rule's defined handling actions could include actions of both (i) storing log entries having a given log identity in accordance with a given sampling rate, and also (ii) storing log entries having the given log identity in a compressed format. To illustrate with a second example, an identity-based handling rule's defined handling actions could include actions of both (i) deriving a given type of metric based on log entries having a given log identity, which is stored along with other metric data, and (ii) either blocking the log entries having the given log identity from being stored or storing the log entries having the given log identity in a different storage location than the default (e.g., a lower storage tier). Many other examples are possible as well.

When the log management engine 208 is configured to execute identity-based handling rules such as those described above, then for each received log entry, the log management engine 208 may function to (i) determine the received log entry's identity by carrying out the disclosed log identification functionality, and (ii) evaluate whether the log management engine 208 is configured with any identity-based handling rule for the received log entry's determined identity. If the log management engine's evaluation reveals that there is no identity-based handling rule for the log entry's determined identity, then the log management engine 208 may handle the log entry in accordance with its default behavior, which may be to store the log entry into a "default" storage location within the log storage subsystem 210 (among other possible default handling actions). Alternatively, if the log management engine's evaluation reveals that there is an identity-based handling rule for the log entry's determined identity, then the log management engine 208 may handle the log entry in accordance with the identity-based handling rule (e.g., by discarding the log entry, storing in accordance with a sampling rule, storing in a different storage location, deriving a metric, etc.).

In practice, the identity-based handling rules that are executed by the log management engine 208 may be created as a result of a log learning phase, such as the one referenced above, or may alternatively be created in some other manner. For example, one or more of the identity-based handling rules could be pre-programmed into the log management engine 208 prior to its deployment if there already exists some universe of log entries having well-known identities that are to be handled in a particular way, although the log management engine 208 may still have the capability to disable or modify such pre-programmed rules based on input from an admin user and/or subsequent analysis by the log management engine 208.

As yet another possible use case of the disclosed log identification functionality, the log management engine 208 may carry out the above log identification functionality to facilitate an analysis of software behavior at a given log producer 202 (or a given group of log producers 202). For instance, the log management engine 208 may be configured to carry out the disclosed log identification functionality to determine the identities of log entries received from a given log producer 202 (or a given group of log producers 202) and then use the determined identities of the log entries received from the given log producer 202 (or the given group of log producers 202) to evaluate whether there has been any change in the frequency with which log entries having a given log identity are received. While performing such an evaluation, if the log management engine 208 detects such a change, the log management engine 208 may then take any of various actions, examples of which may include raising an alert and/or temporarily adjusting the handling behavior of the log entries having the given log identity.

For example, in a scenario where an identity-based handling rule has been deployed for log entries having a given log identity that causes a reduced volume of received log entries to be stored within the log storage subsystem 210 (e.g., a rule that causes such log entries to be sampled or blocked), the function of adjusting the handling behavior of the log entries having the given log identity when there is a detected change in the frequency of such log entries may involve (i) temporarily suspending the identity-based handling rule for the log entries having the given log identity or (ii) temporarily increasing the sampling rate that is used for storing the log entries having the given log identity, so as to enable a greater extent of the log entries having the given log identity to be stored and therefore available for analysis for the time period during which there was a detected change in the frequency of such log entries.

As still another possible use case of the disclosed log identification functionality, the log management engine 208 may carry out the above log identification functionality to facilitate an analysis of an alert that has been triggered based on log data stored within the log management platform 204. For instance, the log management engine 208 may be configured to log identification functionality to (i) detect that an alert has been triggered by an alerts engine of the back-end platform 204 (or the like) based on log entries that are stored within the log storage subsystem 210, (ii) carry out the disclosed log identification functionality on the log entries that led to the alert being triggered in order to determine the log identities of such log entries, (iii) for at least some of the log identities that are determined (e.g., the log identities that have the most volume), adjust the handling behavior in some way, such as by temporarily suspending any identity-based handling rules for log entries having the log identities and/or temporarily increasing any applicable sampling rate that being used for storing log entries having the log identities, among various other possibilities.

As a further possible use case of the disclosed log identification functionality, the log management engine 208 may carry out the above log identification functionality in order to facilitate the creation of improved dashboard queries that are based on log data stored within the log storage subsystem 210.

For instance, as one possibility, the log identities that are determined by the log management engine 208 during a log learning phase could be presented to an individual tasked with writing dashboard queries as a query parameter that can be included in a dashboard query, and the individual could then utilize such log identities to write dashboard queries, which may provide various improvements over existing dashboard queries, including but not limited to reducing the complexity of the dashboard query, reducing the time and/or cost of executing the dashboard query, and perhaps also improving the accuracy of the dashboard query. If a dashboard query specifying a given log identity is deployed, the log identities of the log entries that are determined by the log management engine 208 during a log handling phase may then be utilized by the log management engine 208 when executing the dashboard query in order to access the log entries that satisfy the query parameters.

As another possibility, the log management engine 208 may be configured to evaluate predefined dashboard queries that are designed to access log data stored within the log storage subsystem 210 in order to identify any predefined dashboard query that is designed to present log data in a metric-like form, and if the log management engine 208 identifies such a predefined dashboard query, the log management engine 208 may then function to (i) determine the log identity (or log identities if there are multiple) of the log entries that are being presented in metric-like form, (ii) update the handling of log entries having the determined log identity (e.g., by deploying a new identity-based handling rule) such that received log entries having the determined log identity are used by the log management engine 208 to derive a metric that is stored in addition to (or in place of) the log entries having the determined log identity, and (iii) update the predefined dashboard query so that going forward the predefined dashboard query is designed to retrieve the metricized version of the log entries having the determine log identity rather than the log entries themselves. This functionality may provide various advantages, including reducing the complexity of the predefined dashboard query, reducing the time and/or cost associated with running the predefined dashboard query, and perhaps also reducing the volume of stored log data if the log entries having the given entry are simply replaced by the metric in the log storage subsystem 210.

To illustrate with an example, a given predefined dashboard query may be designed to, during query time, (i) access log data stored within the log storage subsystem 210, (ii) transmit certain log data that meets some criteria (e.g., log entries that contain a certain type of HTTP response status code, such as HTTP 200, among various other possible criteria) to a dashboard engine associated with the dashboard query, (iii) derive a new metric based on an aggregation of the log data that meets the criteria (e.g., the new metric may be a count of how many log entries meet that criteria), and then (iv) present the new metric on a dashboard or the like.

In such an example, the log management engine 208 may analyze various predefined dashboard queries to identify the given dashboard query, and, in response to identifying the given dashboard query, perform the functionality previously described such that instead of the given predefined dashboard query creating a new metric at query time based on the log data that meets the criteria, the log management engine 208 may instead derive that metric at storage time, for example by implementing a new handling rule that creates a new metric at storage time based on received log entries that are determined to meet the criteria, and then either store the new metric in place of the log entries that are determined to include the criteria or in addition to such log entries and then also update the given dashboard query so that instead of accessing stored log data to aggregate certain log entries that are determined to include the criteria into metric-like data at query time, the given dashboard query may instead simply request and receive the new metric that was written by the log management engine 2 08 at storage time.

The disclosed log identification functionality may be carried out by the log management engine 208 at various other times and/or for various other purposes as well.

As discussed above, in at least some implementations, a log producer 202 may also be installed with a log management agent that is configured to carry out the disclosed log identification functionality. In this respect, as with the log management engine 208, the disclosed log identification functionality may be utilized by such a log management agent in order to classify log entries based on their syntax and then use this log classification for various purposes.

For instance, as one possible use case, the log management agent installed at a given log producer 202 may be configured to engage in a "log handling" phase during which the log management agent carries out the log identification functionality in order to determine the identities of the log entries that are produced by the given log producer 202 for the purpose of determining whether and to what extent the log entries that are produced by the log producer 202 are to be transmitted to the log management platform 204.

For instance, the log management agent installed at the given log producer 202 may be configured to execute certain "identity-based handling rules" for handling log entries, where each such identity-based handling rule defines a given set of one or more handling actions that are to be taken on log entries having a given log identity. The one or more handling actions that are defined by an identity-based handling rule could take any of various forms.

One possible handling action that may be defined by an identity-based handling rule for log entries having a given log identity may comprise an action of blocking log entries having the given log identity from being transmitting to the log management platform 204, which may reduce both the transmission footprint as well as the storage footprint of log entries having the given log identity.

Another possible handling action that may be defined by an identity-based handling rule for log entries having a given log identity may comprise an action of persistently transmitting log entries having the given log identity to the log management platform 204 in accordance with a given sampling rate for transmitting a reduced extent of log entries having the given log identity. For example, if the log management agent installed at the given log producer 202 were operating in accordance with an identity-based handling rule that defines a handling action specifying a sampling rate of 10% for transmission of log entries having a given identity, then the log management agent installed at the given log producer 202 may function to transmit 10% of produced log entries having the given log identity (e.g., every $10^{th}$ log entry having the given log identity) to the log management platform 204 while discarding (or taking some other action such as storing in a lower tier) the other 90% of produced log entries having the given log identity. Other examples of transmitting log entries in accordance with a given sampling rate may also exist.

Yet another possible handling action that may be defined by an identity-based handling rule for log entries having a given log identity may comprise an action of transmitting log entries having the given log identity to the log management platform 204 in a compressed format, which may reduce the transmission footprint of such log data. For example, such a handling action may involve removing or splitting certain portions of the log entries having the given log identity prior to transmission (e.g., known, fixed portions of the log entries that can be re-inserted later as needed and/or portions that are not critical to the analysis of such log entries later) and/or replacing certain portions of the log entries having the given log identity with reduced-size representations of such portions, such as reduced-size placeholder elements that allow the replaced portions of the log entries to be re-inserted later as needed, among other possible ways of compressing log entries having the given identity for purposes of storage.

A further possible handling action that may be defined by an identity-based handling rule for log entries having a given log identity may comprise an action of deriving a given type of metric based on the log entries having the given log identity and then transmitting the derived metric either together with or in place of the log entries having the given log identity. To illustrate with one specific example, if the given log identity serves to identify log entries containing HTTP response status codes, such a handling action may involve deriving a metric that indicates a volume of produced log entries that contain a certain type of HTTP response status code (e.g., HTTP 200) and transmitting such a metric to the log management platform 204 along with or in place of the log entries having the given log identity. Many other examples are possible as well.

Yet a further possible handling action that may be defined by an identity-based handling rule for log entries having a given log identity may comprise a "conditional" version of one of the foregoing actions that is conditioned on some value included within the log entries having the given log identity. For example, if the given log identity serves to identify log entries containing HTTP response status codes, then such a handling action may comprise a "conditional" version of one of the foregoing actions that is conditioned on a particular HTTP response status code is contained within a log entry having the given log identity (e.g., a handling action that is to be carried out if a log entry contains an HTTP 200 code specifically).

The handling actions that may be defined by an identity-based handling rule for log entries having a given log identity may take various other forms as well. Further, in line with the discussion above, an identity-based handling rule may define multiple different handling actions. To illustrate with an example, an identity-based handling rule's defined handling actions could include actions of both (i) transmitting log entries having a given log identity to the log management platform 204 in accordance with a given sampling rate, and also (ii) transmitting log entries having the given log identity to the log management platform 204 in a compressed format. Many other examples are possible as well.

When the log management agent of the given log producer 202 is configured to execute identity-based handling rules such as those described above, then for each produced log entry, the log management agent may function to (i) determine the produced log entry's identity by carrying out the disclosed log identification functionality, and (ii) evaluate whether the log management agent is configured with any identity-based handling rule for the produced log entry's determined identity. If the log management agent's evaluation reveals that there is no identity-based handling rule for the log entry's determined identity, then the log management agent may handle the log entry in accordance with its default behavior, which may be to transmit the log entry to the log management platform 204 (among other possible default handling actions). Alternatively, if the log management agent's evaluation reveals that there is an identity-based handling rule for the log entry's determined identity, then the log management agent may handle the log entry in accordance with the identity-based handling rule (e.g., by discarding the log entry, transmitting in accordance with a sampling rule, deriving a metric, etc.).

In practice, the identity-based handling rules that are executed by the log management agent may be created as a result of a log learning phase of the log management engine 208, such as the one referenced above, and the log management engine 208 may be configured to transmit the identity-based handling rules created as a result of the log learning phase to the log management agent. Alternatively, the identity-based handling rules that are executed by the log management agent may be created in some other manner. For example, one or more of the identity-based handling rules could be pre-programmed into the log management agent prior to its deployment if there already exists some universe of log entries having well-known identities that are to be handled in a particular way, although the log management agent may still have the capability to disable or modify such pre-programmed rules based on input from an admin user and/or subsequent analysis by the log management agent.

As another possible use case of the disclosed log identification functionality, the log management agent may carry out the above log identification functionality to facilitate an analysis of software behavior at the log producer 202 installed with the log management agent. For instance, the log management agent may be configured to carry out the disclosed log identification functionality to determine the identities of log entries produced by the log producer 202 and then use the determined identities of those log entries to evaluate whether there has been any change in the frequency with which log entries having a given log identity are produced. While performing such an evaluation, if the log management agent detects such a change, the log management agent may then take any of various actions, examples of which may include raising an alert and/or temporarily adjusting the handling behavior of the log entries having the given log identity.

For example, in a scenario where an identity-based handling rule has been deployed for log entries having a given log identity that causes a reduced volume of produced log entries to be transmitted to the log management platform 204 (e.g., a rule that causes such log entries to be sampled or blocked), the function of adjusting the handling behavior of the log entries having the given log identity when there is a detected change in the frequency of such log entries may involve (i) temporarily suspending the identity-based handling rule for the log entries having the given log identity or (ii) temporarily increasing the sampling rate that is used for transmitting the log entries having the given log identity to the log management platform 204, so as to enable a greater extent of the log entries having the given log identity to be transmitted to the log management platform 204 and therefore be available for analysis for the time period during which there was a detected change in the frequency of such log entries.

The disclosed log identification functionality may be carried out by a log management agent installed at a log producer 202 at various other times and/or for various other purposes as well.

Figure 5A:
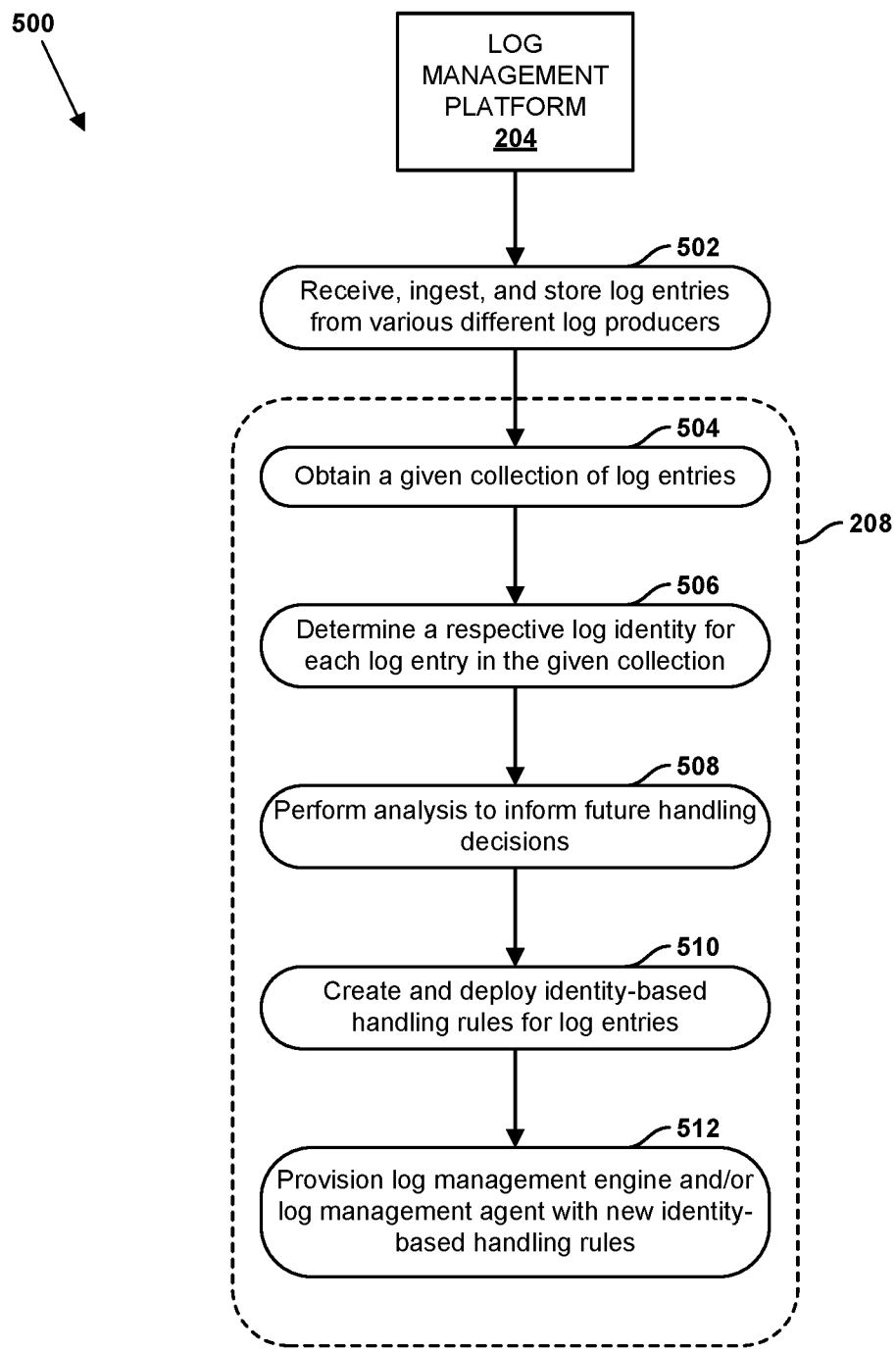
FIG. 5A illustrates a flow diagram showing one possible example of operations that may be performed during a log learning phase in accordance with the present disclosure.

As discussed above, the log management engine 208 may engage in a log learning phase during which the log management engine 208 carries out the disclosed log identification functionality in order to determine the identities of a given collection of log entries that were previously received and stored by the log management platform 204 for the purpose of performing some analysis that informs the future handling of log entries. FIG. 5A illustrates a flow diagram 500 showing one possible example of operations that may be performed during such a log learning phase in accordance with the present disclosure.

As shown in FIG. 5A, this example use case may begin at block 502 with the log management platform 204 receiving, ingesting, and storing log entries from various different log producers 202. In line with the discussion above, each of the log producers 202 may take any of various forms, examples of which may include a client device installed with a client application that is configured to produce and transmit log data (e.g., a mobile application, desktop application, web application, etc.) or a server installed with a server application that is configured to produce and transmit log data (e.g., a back-end service such as a microservice), among other possibilities. Further, in line with the discussion above, the log entries that are produced by each of the log producers 202 may have any of various formats—each such log entry could contain one or more data elements that may each be expressed in either a structured format (e.g., a key-value pair) or an unstructured format (e.g., a raw string of alphanumeric characters). Further yet, the log producers 202 may transmit their log entries to the log management platform 204 at various different times. For example, some log producers 202 may initiate transmissions of log entries periodically according to a schedule (e.g., every hour, once per day, etc.), other log producers 202 may initiate transmissions of log entries in response to certain triggering events (e.g., the conclusion of a runtime session of the log producer's log-producing software component, the production of a threshold volume of new log entries, etc.), and still other log producers 202 may transmit log entries in a streaming manner as such log entries are produced, among other possibilities.

At block 504, the log management engine 208 may obtain a given collection of log entries that are to be analyzed as part of a log learning phase, which may comprise at least a subset of the log entries that were previously received from log producers 202 and stored within the log storage subsystem 210. For instance, the given collection of log entries may comprise log entries received from at least a subset of the log producers 202 (e.g., a selected group of log producers 202) that were produced and/or received during a certain window of time in the past, among other possible criteria that may be used to define the given collection of log entries that are to be analyzed as part of the log learning phase. Further, in practice, the log management engine 208 may obtain the given collection of log entries by either retrieving the given collection of log entries from the log storage subsystem 210 and/or receiving the given collection of log entries from another subsystem of the log management platform 204 that is tasked with providing log entries to the log management engine 208, among other possibilities.

At block 506, the log management engine 208 may then carry out the disclosed log identification functionality on the given collection of log entries in order to determine a respective log identity of each log entry in the given collection. For instance, in line with the discussion above, the log management engine 208 may determine a respective log identity of each log entry in the given collection by (i) producing a restructured representation of the log entry comprising a sequence of one or more tokens that are representative of the one or more data elements contained within the log entry and (ii) translating the restructured representation of the log entry into a hash (or the like) that serves as the respective log identity of the log entry.

At block 508, the log management engine 208 may then use the respective log identities that are determined for the given collection of log entries as a basis for performing an analysis that is to inform future handling decisions for log entries that are received by the log management platform 204. This analysis may take any of various forms.

As one possibility, the analysis that is carried out by the log management engine 208 at block 508 may involve (i) grouping the log entries within the given collection according to their determined log identities, such that log entries having the same log identities (e.g., the same syntax) are grouped together, and then (ii) for each of the different log identities, quantifying the extent of the log entries within the given collection that were determined to have the log identity (e.g., the total number of log entities within the given collection that were determined to have the log identity), which provides an indication of the "write activity" for log entries having the identity.

To illustrate with an example, if the given collection of log entries includes multiple log entries comprising the phrase "Processing items for bucket" followed by a numeric value, such as a first log entry with a payload of "Processing items for bucket 1066", a second log entry with a payload of "Processing items for bucket 24", and so on, these log entries may be determined to have the same identity at block 506, and then at block 208, the log management engine 508 may group these log entries together into a given group based on their common log identity and count how many log entries are included in the given group—which may then inform future handling decisions for log entries having that log identity.

As another possibility, the analysis that is carried out by the log management engine 208 at block 508 may involve (i) grouping the log entries within the given collection according to their determined log identities, such that log entries having the same log identities (e.g., the same syntax) are grouped together, (ii) obtaining data indicating the "read activity" for the log entries in the given collection (e.g., data indicating whether and to what extent each such log entry has been consumed by log consumers 212 during some window of time in the past), and (iii) for each of the different log identities, quantifying the read activity for log entries that were determined to have the log identity in some way (e.g., by determining a count of how many times the log entries having the identity were consumed by the log consumers 212 during some window of time in the past).

To illustrate with an example, if the given collection of log entries includes multiple log entries comprising the phrase "Processing items for bucket" followed by a numeric value, such as a first log entry with a payload of "Processing items for bucket 1066", a second log entry with a payload of "Processing items for bucket 24", and so on, these log entries may be determined to have the same identity at block 506, and then at block 508, the log management engine 208 may group these log entries together into a given group based on their common log, obtain data indicating the "read activity" for the log entries in the given group, and quantify how much read activity took place for log entries in the given group, such as how many times the log entries in the given group were read from the log storage subsystem 210 during some window of time in the past, what percentage of the log entries in the given group were read from the log storage subsystem 210 during some window of time in the past, how recently any log entry in the given group was read from the log storage subsystem 210, and/or what the average last-read time was for the log entries in the given group, among other possible ways of quantifying how much read activity took place for log entries in the given group—which may then inform future handling decisions for log entries having that log identity.

As yet another possibility, the analysis that is carried out by the log management engine 208 at block 508 may involve (i) accessing certain predefined queries that are designed to consume log data stored within the log storage subsystem 210 (e.g., predefined queries that are to be run by dashboard applications, alert engines, or the like), (ii) based on the criteria of the predefined queries and the log identities determined for the given collection of log entries, determining whether and to what extent the different log identities are being utilized by the predefined queries (e.g., by determining a respective number of predefined queries that are designed to consume log entries having each of the different identities).

To illustrate with an example, if the log management engine 208 identifies a predefined query that is designed to consume log entries within the given collection comprising the phrase "Processing items for bucket" followed by a numeric value, such as a first log entry with a payload of "Processing items for bucket 1066", a second log entry with a payload of "Processing items for bucket 24", and so on, which were determined to have the same log identity at block 506, and then at block 508, the log management engine 208 may determine that there is at least one predefined query that is designed to consume log entries having that log identity—which may then inform future handling decisions for log entries having that log identity.

The analysis that is carried out by the log management engine 208 at block 508 based on the determined log identities for the given collection of log entries may take various other forms as well.

In turn, at block 510, log management engine 208 may use the analysis that was carried out at block 508 as a basis for facilitating the creation of one or more new identity-based handling rules for log entries. This function may take various forms.

In one implementation, the log management engine 208 may cause results of the analysis carried out at block 508 to be presented to users of the log management platform 204 via a graphical user interface (GUI) that facilitates creation of new identity-based handling rules for log entries. In this respect, depending on the nature of the analysis carried out at block 508, the types of information that may be presented via such a GUI may take any of various forms.

As one example, the type of information that may be presented via the GUI may take the form of "write activity" information for certain log identities that were determined by the log management engine 208 during its analysis of the given collection of previously-stored log entries. In such an example, the GUI may include information that identifies certain log identities that were determined by the log management engine 208 during its analysis of the given collection of previously-stored log entries, such as a listing of log identities and perhaps also a representative log entry for each such log identity, along with some indication of the write activity for each presented log identity, such as a count of how many log entries within the given collection of previously-stored log entries were determined to have the log identity and/or what percentage of the log entries in the given collection of previously-stored log entries were determined to have the log identity, among other possible indications of write activity. Further, the listing of log identities may also be sorted according to the extent of write activity that is determined for such log identities, such that log identities having are greater extent of write activity are presented at the top of the list and log identities having are lesser extent of write activity are presented at the bottom of the list.

As another example, the type of information that may be presented via the GUI may take the form of "read activity" information for certain log identities that were determined by the log management engine 208 during its analysis of the given collection of previously-stored log entries. In such an example, the GUI may include information that identifies certain log identities that were determined by the log management engine 208 during its analysis of the given collection of previously-stored log entries, such as a listing of log identities and perhaps also a representative log entry for each such log identity, along with some indication of the read activity for each presented log identity, such as a count of how many times the log entries having the log identity were read from the log storage subsystem 210 during some window of time in the past, a percentage of the log entries having the log identity were read from the log storage subsystem 210 during some window of time in the past, an indication of recently any log entry having the log identity was read from the log storage subsystem 210, and/or an average last-read time for the log entries having the log identity, among other possible indications of read activity. Further, the listing of log identities may also be sorted according to the extent of read activity that is determined for such log identities, such that log identities having are greater extent of read activity are presented at the top of the list and log identities having are lesser extent of read activity are presented at the bottom of the list.

As yet another example, the type of information that may be presented via the GUI may take the form of "query activity" information for certain log identities that were determined by the log management engine 208 during its analysis of the given collection of previously-stored log entries. In such an example, the GUI may include information that identifies certain log identities that were determined by the log management engine 208 during its analysis of the given collection of previously-stored log entries, such as a listing of determined log identities and perhaps also a representative log entry for each such log identity, along with some indication of the query activity for each presented log identity, such as a count of how many predefined queries are designed to consume log entries having the log entity and/or how many times predefined queries designed to consume log entries were run during some window of time in the past, among other possible indications of query activity. Further, the listing of log identities may also be sorted according to the extent of query activity that is determined for such log identities, such that log identities having are greater extent of query activity are presented at the top of the list and log identities having are lesser extent of query activity are presented at the bottom of the list.

In practice, the GUI may include various other types of information in addition to those described, and the type of information that is displayed on the GUI may be determined based on a number of factors, such as the type of analysis that is performed by the log management engine 208, among other possibilities.

Along with displaying any of the mentioned types of information to a user for the determined identities of the log entries in the given collection, the GUI may also enable a user to create one or more new identity-based handling rules for log entries having certain log identities. For example, the GUI may present a user with the ability to (i) access a listing of available handling actions that could be implemented for a given log identity (e.g., via a selectable dropdown menu), and then (ii) select one or more of the handling actions from the listing, which may then cause a new identity-based handling rule to be created for the given log identity that includes the selected one or more handling actions. In line with the discussion above, the listing of available handling actions may include any of various different types of handling actions that may be carried out by the log management engine 208 during a log handling phase, including but not limited to (i) blocking log entries with the given log identity from being stored, (ii) storing log entries with the given log identity in accordance with a given sampling rate, (iii) storing log entries with the given log identity in a different storage location, (iv) storing log entries with the given log identity in a compressed format, and (v) deriving and storing a metric based on log entries having the given log identity, among other possible handling actions. Further, in at least some implementations, the listing of available handling actions could also include any of various different types of handling actions that may be carried out by the log management agent running on a log producer 202, including but not limited to (i) blocking log entries with the given log identity from being stored, (ii) transmitting log entries with the given log identity in accordance with a given sampling rate, (iii) transmitting log entries with the given log identity to the log management platform 204 in a compressed format, and (iv) deriving and transmitting a metric based on log entries with the given log identity, among other possible handling actions.

In at least some implementations, along with presenting the user with a listing of handling actions, the GUI could additionally present the user with other information that assists the user in the task of creating identity-based handling rules. For instance, as one possibility, the GUI could additionally present the user with recommendations for which handling actions to select for certain identities, such as by including a "recommended" indicator (e.g., an asterisk) next to the handling actions within the listing available handling actions that are recommended. As another possibility, the GUI may present a user with a listing of pre-created identity-based handling rules that are recommended by the log management engine 208 and enable the user to select one or more of those recommended identity-based handling rules, which may then cause one or more new identity-based handling rules to be created. As yet another possibility, the GUI could additionally present the user with information regarding the cost impact of implementing the different handling actions for a given log identity, such as an indication of a predicted cost savings that could be achieved by creating and deploying an identity-based handling rule comprising each of the different handling actions (e.g., a first predicted cost savings if a "discard" action is selected for a given log identity, a second predicted savings if a "store in a different storage location" action is selected for a given log identity, and so on). The GUI could present the user with other information that assists the user in the task of creating identity-based handling rules as well.

Further, there may be various other ways in which the GUI may enable a user to create one or more new identity-based handling rules for log entries.

Figure 5B:
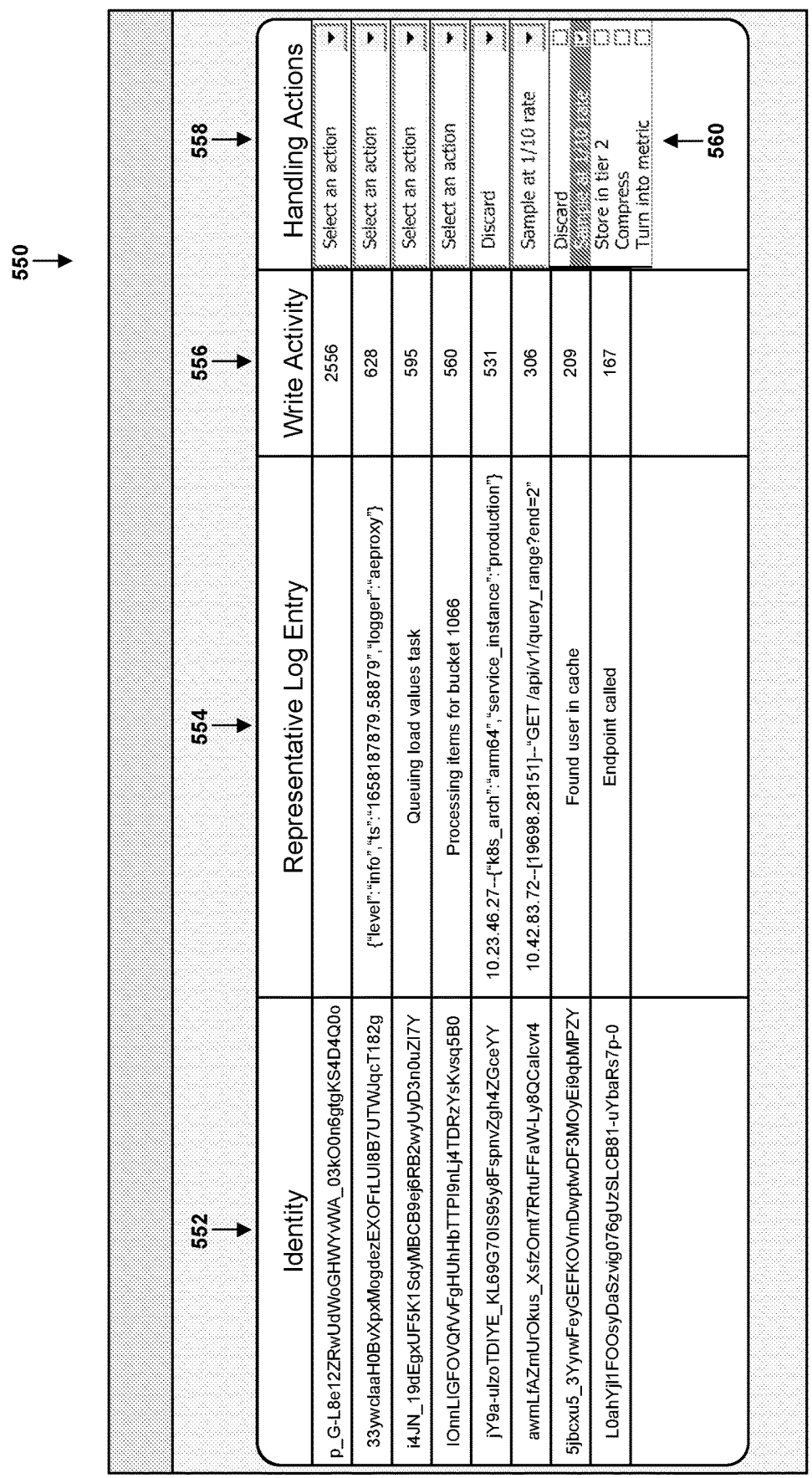
FIG. 5B illustrates one possible example of a GUI that may facilitate the creation of new identity-based handling rules for log entries, in accordance with the present disclosure.

To further illustrate this functionality, FIG. 5B shows one possible example of a GUI 550 that may facilitate the creation of new identity-based handling rules for log entries, in accordance with the present disclosure.

The GUI 550 may be provided to users of the log management platform 204 as part of the log learning phase of the log management engine 208 and may be based on an analysis performed by the log management engine 208 on log data obtained by the log management engine 208 as part of said log learning phase. As discussed previously, the analysis may take the form of an analysis of write activity for log entries having certain identities, an analysis of read activity for log entries having certain identities, or an analysis of query activity for log entries having certain identities, among various other possibilities.

In general, the GUI 550 serves to provide users with information regarding an analysis performed by the log management engine 208, so as to allow the users to make a determination on whether to create a new identity-based handling rule for log entries having certain identities, as well as to provide users with an interactive display that enables a user to (i) access a listing of available handling actions that could be implemented for a given log identity, and then (ii) select one or more of the handling actions from the listing, which may then cause a new identity-based handling rule to be created for the given log identity that comprises the selected one or more handling actions.

As shown in FIG. 5A, the GUI 550 includes (i) a first column 552 labeled "Identity" that displays a listing of certain log identities that were determined by the log management engine 208 during its analysis of the given collection of previously-stored log entries (ii) a second column 554 labeled "Representative Log Entry" that displays an example representative log entry for each of the log identities displayed in the first column 552, and (iii) a third column 556 labeled "Write Activity" that displays an indication of the extent of the write activity for each of the log identities displayed in the first column 552, which in this example takes the form of a count of how many log entries in the given collection of previously-stored log entries were determined to have the log identity. However, in line with the discussion above, it should be understood that the "Write Activity" column could display some other indication of written activity as well. In line with the discussion above, it should also be understood that, in alternative or in addition to the "Write Activity" column, the GUI 550 could include a column that displays an indication of the extent of the read activity or query activity for each of the log identities displayed in the first column 552.

As further shown in FIG. 5A, the GUI 550 includes a fourth column 558 labeled "Handling Actions" that displays a dropdown menu for each of the log identities displayed in the first column 552 to allow users to select between various handling actions that may be included in a new identity-based handling rule the log identity, of which dropdown menu 560 is shown as a specific example. In practice, before a user selects a handling action, the dropdown menu 560 for a given log identity may include the text "Select an action" to prompt the user to utilize the dropdown menu 560 to select between the various handling actions presented therein, which are shown to include handling actions such as blocking log entries with the given log identity from being stored, storing log entries with the given log identity according to a 10% sampling rate, storing log entries with the given log identity in a different storage tier (e.g., in tier 2), compressing the log entries, and deriving a metric based on log entries having the given log identity (which, if selected, may prompt the GUI 550 to present a pop-up window or the like that enables the user to define the metric), among various other possible handling actions.

Thus, as shown in FIG. 5A, each row of the GUI 550 may display information for a respective log identity that determined by the log management engine 208 that includes (i) the respective log identity (e.g., the SHA-3 hash), (ii) a representative log entry for the respective log identity, (iii) an indication of the extent of write activity for the respective log identity, and (iv) an indication of what handling actions may be included in a new identity-based handling rule for log entries having the respective log identity.

Although not shown, in line with the discussion above, the GUI 550 could also present other information that assists the user in the task of creating identity-based handling rules. For instance, as one possibility, the GUI 550 could additionally present recommendations for which handling actions to select for certain identities, such as by including a "recommended" indicator (e.g., an asterisk) next to the handling actions within the listing available handling actions that are recommended. As another possibility, the GUI 550 could present a listing of pre-created identity-based handling rules that are recommended by the log management engine 208 and enable the user to select one or more of those recommended identity-based handling rules, which may then cause one or more new identity-based handling rules to be created. As yet another possibility, the GUI 550 could additionally present information regarding the cost impact of implementing the different handling actions for a given log identity, such as an indication of a predicted cost savings that could be achieved by creating and deploying an identity-based handling rule comprising each of the different handling actions shown in the dropdown menu. The GUI could present the user with other information that assists the user in the task of creating identity-based handling rules as well.

It should be noted that the GUI 550 is merely one example of one implementation for how the log management engine 208 may use the results of the analysis carried out at block 508 as a basis for facilitating the creation of one or more new identity-based handling rules for log entries.

In another implementation, the log management engine 208 could use the results of the analysis carried out at block 508 as a basis for automatically creating one or more new identity-based handling rules. This function could take any of various forms.

For example, if the analysis carried out at block 508 involves quantifying the respective read activity for each of the different log identities during some period of time in the past, the log management engine 208 could (i) compare each log identity's respective read activity against threshold criteria (e.g., a threshold number of times that log entries having the log identity were consumed by log consumers 212 during the period of time in the past) and (ii) for each log identity having read activity that does not satisfy the threshold criteria, the log management engine 208 may automatically create a new identity-based handling rule for the log identity that is to reduce the volume of stored log entries having the log identity going forward. In this respect, the identity-based handling rule that is automatically created for the log identity could comprise a rule that is to be deployed by the log management engine 208, in which case the rule may include one or more handling actions that are to be carried out by the log management engine 208 after log entries having the log identity have been transmitted to the log management platform 204, or the identity-based handling rule that is automatically created for the log identity could comprise a rule that is to be deployed by log management agents installed at the log producers 202, in which case the rule may include one or more handling actions that are to be carried out by a log management agent before log entries having the log identity are even transmitted to the log management platform 204.

The log management engine 208 could use the results of the analysis carried out at block 508 as a basis for performing other tasks as well.

At block 512, the log management engine 208 may then cause each new identity-based handling rule created at block 510 to be deployed. For instance, if a new identity-based handling rule is to be deployed by the log management engine 208, then the log management engine 208 may provision itself to begin executing the new identity-based handling rule, which may involve updating the log management engine's existing set of identity-based handling rules to include the new identity-based handling rule. Alternatively, if a new identity-based handling rule is to be deployed by log management agents installed at the log producers 202, then the log management engine 208 may instruct each of the log management agents to update its existing set of identity-based handling rules to include the new identity-based handling rule. The function of causing each new identity-based handling rule created at block 510 to be deployed may take various other forms as well.

The log learning phase described in the FIG. 5A may take any of various other forms, including the addition of certain blocks representing further operations that may be included in the log learning phase of the log management engine 208, as well as the removal of one or more of the blocks 502-512 of FIG. 5A. Further, the log learning phase described in FIG. 5A may be triggered at any of various times, such as during an initial setup phase of the log management engine 208, or according to some cadence (e.g., every n days, after the receipt of x number of log entries, etc.), among various other possibilities.

As previously discussed, the log management engine 208 may further be configured to engage in a "log handling" phase, which as noted above involves determining the log identities of log entries received by the log management platform 204 for the purpose of making storage handling decisions for such log entries. Accordingly, FIG. 6 illustrates a flow diagram 600 of an example use case where the disclosed log identification functionality is carried out by the log management engine 208 as part of such a log handling phase, in accordance with the present disclosure.

Figure 6:
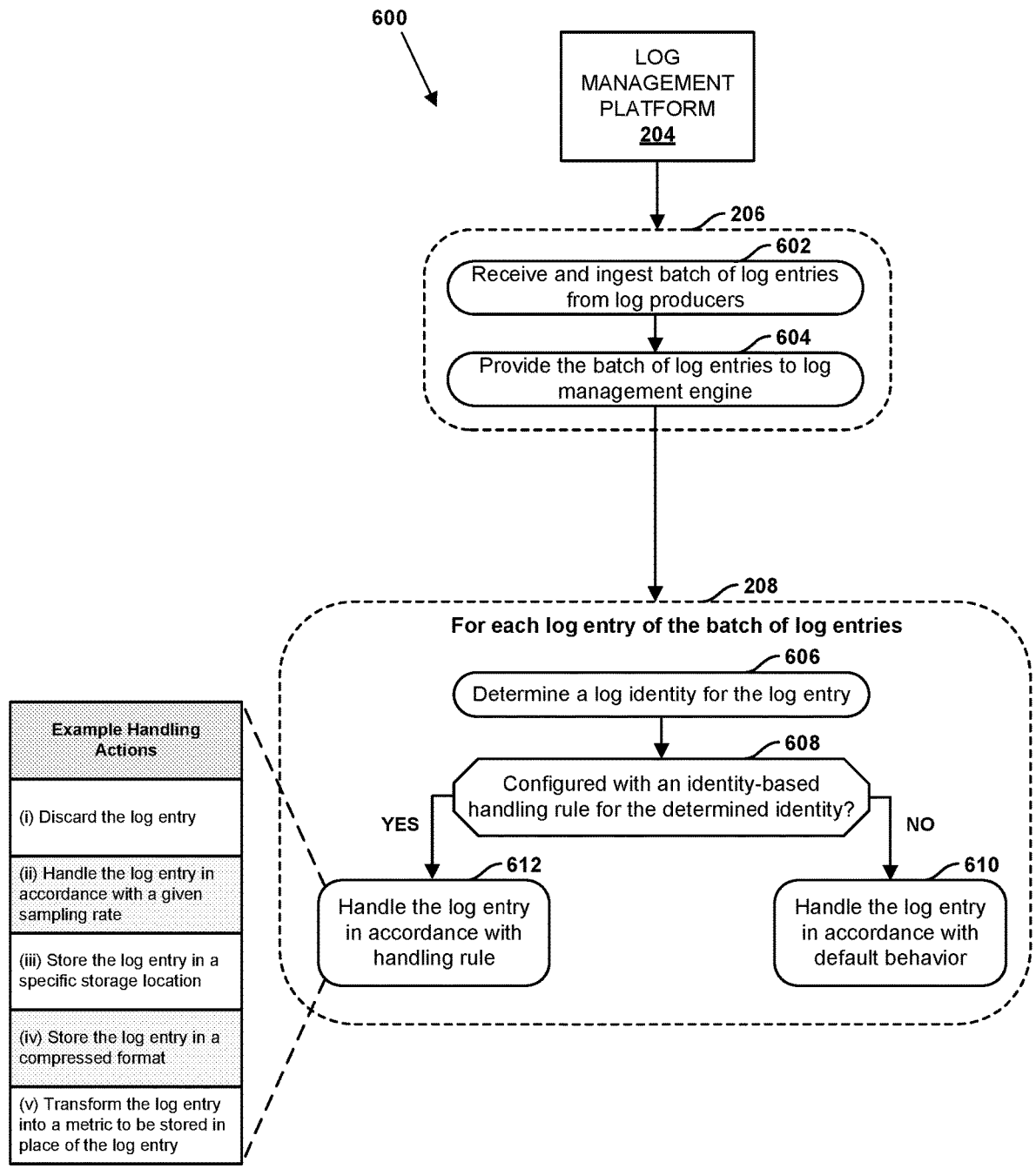
FIG. 6 illustrates a flow diagram of an example use case where log identification functionality is carried out by a log management agent as part of a "log handling" phase, in accordance with the present disclosure.

As shown at FIG. 6, this example use case may begin at block 602 with the log ingestion subsystem 206 of the log management platform 204 receiving and ingesting a batch of log entries from a given log producer 202, such as log producer 202A. In line with the discussion above, the log producer 202A may take any of various forms, examples of which may include a client device installed with a client application that is configured to produce and transmit log data (e.g., a mobile application, desktop application, web application, etc.) or a server installed with a server application that is configured to produce and transmit log data (e.g., a back-end service such as a microservice), among other possibilities. Further, in line with the discussion above, the log entries that are produced by the log producer 202A may have any of various formats—each such log entry could contain one or more data elements that may each be expressed in either a structured format (e.g., a key-value pair) or an unstructured format (e.g., a raw string of alphanumeric characters). Further yet, the log producer 202A may transmit the batch of log entries to the log management platform 204 at various different times. For example, the log producer 202A could transmit the batch of log entries according to a schedule or in response to a triggering event (e.g., the conclusion of a runtime session of the log producer's log-producing software component, the production of a threshold volume of new log entries, etc.), among other possibilities.

In turn, at block 604, the log ingestion subsystem 206 may provide the received batch of log entries to the log management engine 208. In this respect, the log ingestion subsystem 206 may provide the received batch of log entries to the log management engine 208 either by passing the received batch of log entries directly to the log management engine 208 or by writing the received batch of log entries to a designated storage location within the log storage subsystem 210 (e.g., a temporary queue) that is then read by the log management engine 208 in order to access the received batch of log entries, among other possibilities.

For each log entry in the received batch, the log management engine 208 may then carry out a sequence of operations in order to make a handling decision with respect to each of the log entries in the batch, which will now be explained with reference to one given log entry within the received batch.

Starting at block 606, the log management engine 208 may carry out the disclosed log identification functionality on the given log entry in order to determine a log identity of the given log entry. For instance, in line with the discussion above, the log management engine 208 may determine the given log entry's identity by (i) producing a restructured representation of the given log entry comprising a sequence of one or more tokens that are representative of the one or more data elements contained within the given log entry and (ii) translating the restructured representation of the log entry into a hash (or the like) that serves as the respective log identity of the given log entry.

At block 608, after determining the log identity of the given log entry, the log management engine 208 may next determine whether it is configured with an identity-based handling rule for the determined log identity. If this function results in the log management engine 208 failing to identify any identity-based handling rule for the given log entry's determined log identity, then the log management engine 208 may proceed to block 610 and handle the given log entry in accordance with its default log handling behavior, which may be to store the given log entry into a "default" storage location within the log storage subsystem 210 (among other possibilities).

Alternatively, if this function results in the log management engine 208 identifying an identity-based handling rule for the given log entry's determined log identity, then the log management engine 208 may proceed to block 612 and handle the log entry in accordance with that identity-based handling rule. As shown in FIG. 6, in line with the discussion above, this identity-based handling rule may include any of various types of handling actions for given log entry, examples of which may include (i) blocking the given log entry from being stored, (ii) storing the log entry in accordance with a given sampling rate, (iii) storing the given log entry in an alternate storage location within the log storage subsystem 210 (e.g., a colder tier of storage), (iv) storing the given log entry in a compressed format, and/or (v) transforming the given log entry into a metric, among other possible handling actions.

Further, in practice, the log management engine 208 may perform the log handling phase in various other ways, and the example of FIG. 6 is intended to show only one such use case of how the log management engine 208 may carry out the disclosed log identification functionality as part of a log handling phase.

Figure 7:
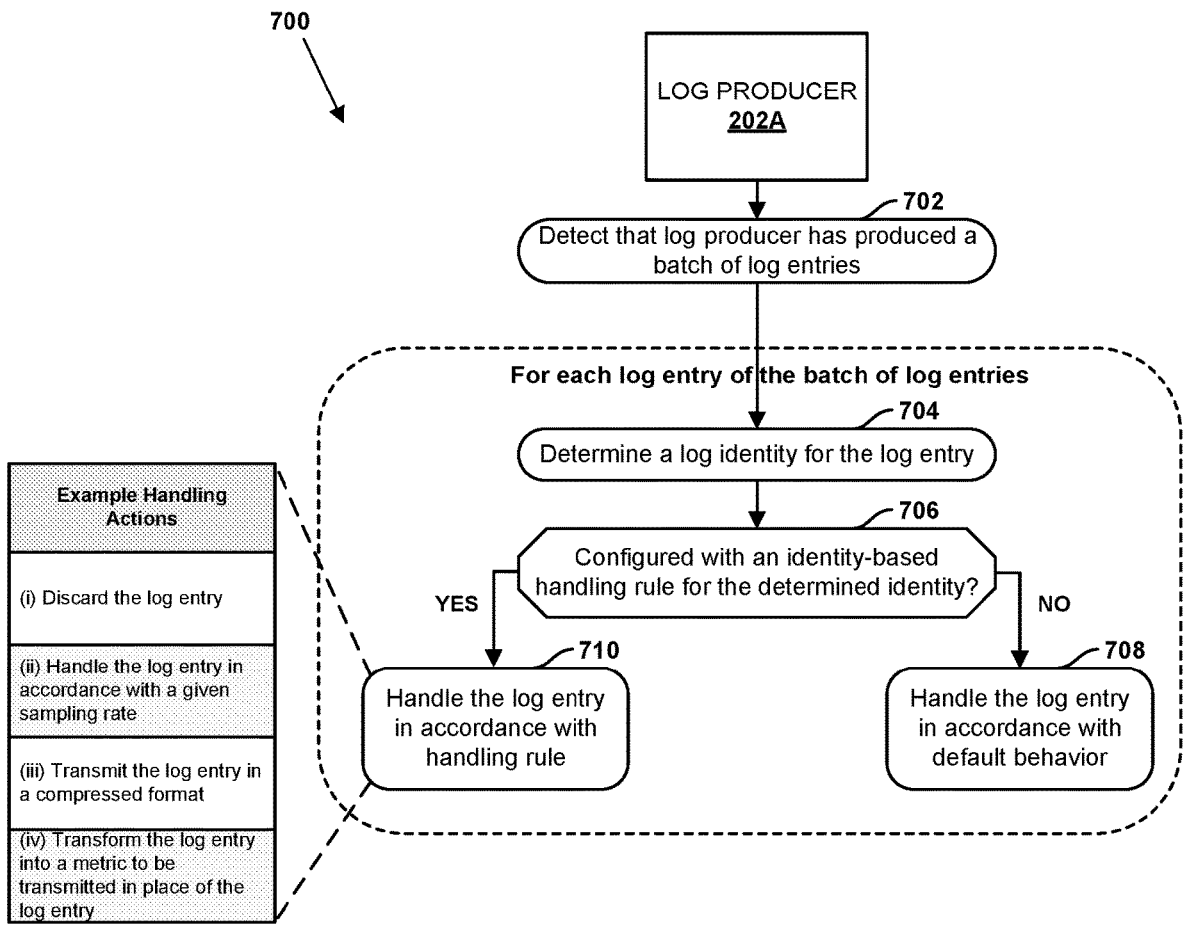
FIG. 7 illustrates a flow diagram of an example use case where log identification functionality is carried out by a log management agent of a given log producer as part of a producer-side log handling phase, in accordance with the present disclosure.

FIG. 7 illustrates a flow diagram 700 of an example use case where the disclosed log identification functionality is carried out by a log management agent of a given log producer 202, such as the log producer 202A, as part of a producer-side "log handling" phase, which as noted above involves determining the identities of log entries received produced by the log producer 202A for the purpose of making handling decisions for the log entries.

As shown at FIG. 7, this example use case may begin at block 702 with the log producer's log management agent detecting that the log producer 202A has produced a batch of log entries for possible transmission to the log management platform 204. In line with the discussion above, the log producer 202A may take any of various forms, examples of which may include a client device installed with a client application that is configured to produce and transmit log data (e.g., a mobile application, desktop application, web application, etc.) or a server installed with a server application that is configured to produce and transmit log data (e.g., a back-end service such as a microservice), among other possibilities. Further, in line with the discussion above, the log entries that are produced by the log producer 202A may have any of various formats—each such log entry could contain one or more that may each be expressed in either a structured format (e.g., a key-value pair) or an unstructured format (e.g., a raw string of alphanumeric characters).

For each log entry in the produced batch, the log management agent may then carry out a sequence of operations in order to make a handling decision with respect to each of the log entries in the batch, which will now be explained with reference to one given log entry within the received batch.

Starting at block 704, the log management agent may carry out the disclosed log identification functionality on the given log entry in order to determine a log identity of the given log entry. For instance, in line with the discussion above, the log management agent may determine the given log entry's log identity by (i) producing a restructured representation of the given log entry comprising a sequence of one or more tokens that are representative of the one or more data elements contained within the given log entry and (ii) translating the restructured representation of the log entry into a hash (or the like) that serves as the respective log identity of the given log entry.

At block 706, after determining the log identity of the given log entry, the log management agent may next determine whether it is configured with an identity-based handling rule for the determined log identity. If this function results in the log management agent failing to identify any identity-based handling rule for the log entry's determined log identity, then the log management agent may proceed to block 708 and handle the log entry in accordance with its default log handling behavior, which may be to transmit the given log entry to the log management platform 204.

Alternatively, if this function results in the log management agent identifying an identity-based handling rule for the given log entry's determined log identity, then the log management agent may proceed to block 710 and handle the given log entry in accordance with that identity-based handling rule. As shown in FIG. 7, in line with the discussion above, this identity-based handling rule may include any of various types of handling actions for a given log entry, examples of which may include (i) blocking the given log entry from being transmitted to the log management platform 204, (ii) handling the given log entry in accordance with a given sampling rate for transmission, (iii) transmitting the given log entry to the log management platform 204 in a compressed format, and/or (iv) transforming the given log entry into a metric that is to be transmitted to the log management platform 204, among other possible handling actions.

Further, in practice, the log management agent may perform the log handling phase in various other ways, and the example of FIG. 7 is intended to show only one such use case of how the log management agent may carry out the disclosed log identification functionality as part of a log handling phase.

Figure 8:
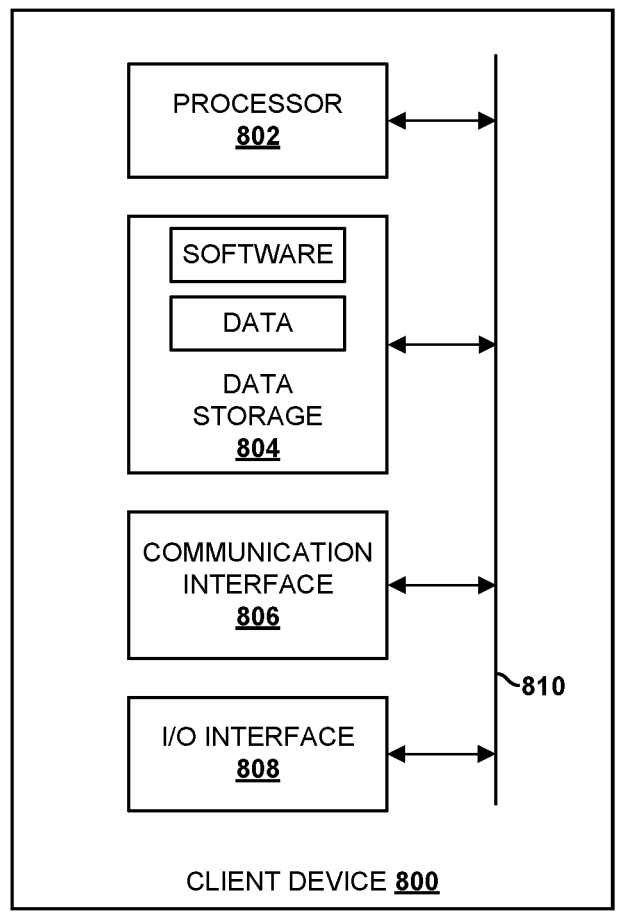
FIG. 8 is a simplified block diagram that illustrates some structural components that may be included in an example client device.

Turning now to FIG. 8, a simplified block diagram is provided to illustrate some structural components that may be included in an example client device 800, which may be configured to carry out any of the various functions disclosed herein, including but not limited to (i) running a client application that produces log data, (ii) running a client application that consumes log data, and/or (iii) running a client application that presents the disclosed GUI for creating identity-based handling rules. At a high level, client device 800 may include one or more processors 802, data storage 804, one or more communication interfaces 806, and an input/output (I/O) interface 808, all of which may be communicatively linked by a communication link 810 that may that various forms, one example of which is a system bus.

The one or more processors 802 of client device 800 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, data storage 804 of client device 800 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 802 of the client device 800 such that the client device 800 is configured to perform any of the client-side functions disclosed herein (e.g., the functionality described above with reference to producing log data, consuming log data, or creating identity-based handling rules), and (ii) data related to the disclosed client-device functionality.

The one or more communication interfaces 808 of client device 800 may take the form of any one or more interfaces that facilitate wireless and/or wired communication with other computing devices or systems, including but not limited to the log management platform 204 of FIG. 1. Each such communication interface 808 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

The I/O interface 808 may generally take the form of (i) one or more input interfaces that are configured to receive and/or capture information at the client device 800 and (ii) one or more output interfaces that are configured to output information from client device 800 (e.g., for presentation to a user). In this respect, the one or more input interfaces of I/O interface 808 may include or provide connectivity to input components such as a microphone, a camera, a keyboard, a mouse, a trackpad, a touchscreen, and/or a stylus, among other possibilities. In turn, the one or more output interfaces of I/O interface 808 may include or provide connectivity to output components such as a display screen and/or an audio speaker, among other possibilities.

It should be understood that the client device 800 is one example of a client device that may be used with the example embodiments described herein. Numerous other arrangements are possible and contemplated herein. For instance, in other embodiments, the client device 800 may include additional components not pictured and/or more or fewer of the pictured components.

Figure 9:
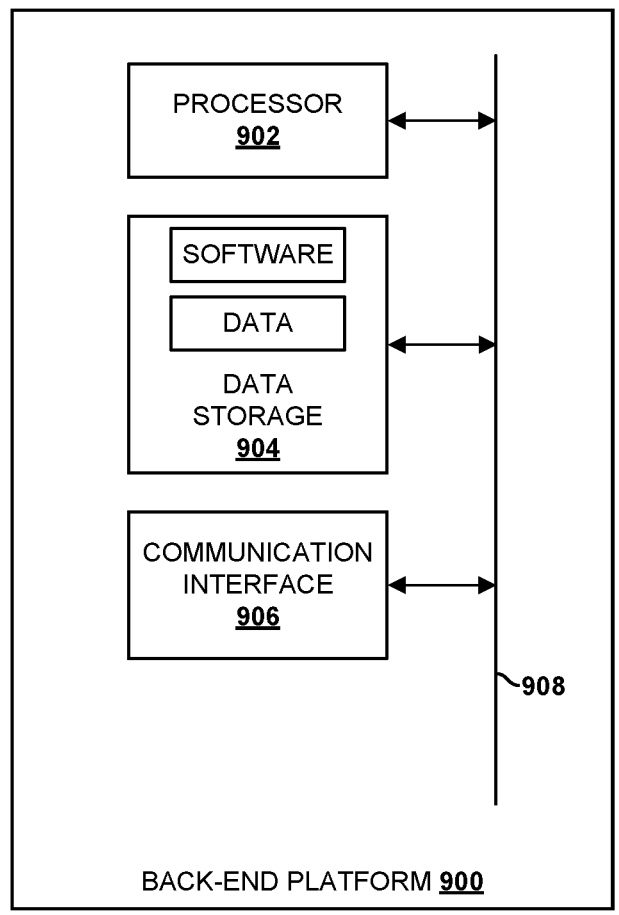
FIG. 9 is a simplified block diagram that illustrates some structural components that may be included in an example back-end platform.

Turning now to FIG. 9, a simplified block diagram is provided to illustrate some structural components that may be included in an example back-end platform 900, which may be configured to carry out any of the various functions disclosed herein. At a high level, back-end platform 900 may generally comprise any one or more computing systems that collectively include one or more processors 902, data storage 904, and one or more communication interfaces 906, all of which may be communicatively linked by a communication link 908 that may take the form of a system bus, a communication network such as a public, private, or hybrid cloud, or some other connection mechanism. Each of these components may take various forms.

The one or more processors 902 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 902 could comprise processing components that are distributed across a plurality of physical computing systems connected via a network, such as a computing cluster of a public, private, or hybrid cloud.

In turn, the data storage 904 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 902 such that the back-end platform 900 is configured to perform any of the various back-end platform functions disclosed herein (e.g., producing log data, consuming log data, and/or managing log data), and (ii) data related to the disclosed back-end platform functionality. In line with the discussion above, it should also be understood that the data storage 904 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interface 906 may take the form of any one or more interfaces that facilitate wireless and/or wired communication with other computing devices or systems, including but not limited to the log producers 202 and log consumers 212 of FIG. 2. Each such communication interface 908 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 900 may additionally include an I/O interface that facilitates user interaction with the back-end platform 900.

It should be understood that back-end platform 900 is one example of a back-end platform that may be used with the embodiments described herein. Numerous other arrangements are possible and contemplated herein. For instance, the back-end platform 900 may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A method implemented by a computing platform, the method comprising:
receiving a log entry that was produced by a log producer, wherein the log entry comprises one or more data elements;
producing a restructured representation of the log entry, the restructured representation comprising a sequence of one or more tokens that represents the one or more data elements of the log entry;
deriving a log identity of the log entry from the sequence of one or more tokens; and
handling the log entry in accordance with a handling rule for the derived log identity, wherein handling the log entry in accordance with the handling rule for the derived log identity comprises one or more of (i) blocking the log entry from being persistently stored, (ii) storing the log entry into a different tier of a multi-tier storage architecture, (iii) handling the log entry in accordance with a sampling rate for storing log data having the derived log identity, (iv) storing the log entry in a compressed format, or (v) storing a metric that is derived based on log entries having the derived log identity either in addition to or in place of the log entry.

2. The method of claim 1, wherein the one or more data elements of the log entry comprise one or more key-value pairs, and wherein producing the restructured representation of the log entry comprises:
translating at least a first key-value pair of the log entry into a corresponding token that represents a key of the first key-value pair.

3. The method of claim 2, wherein producing the restructured representation of the log entry further comprises:
parsing a value of at least a second key-value pair of the log entry into a sequence of tokens that each represents either (i) a key-value pair that is nested within the value of the second key-value pair or (ii) an unstructured portion of the value that matches a respective type of pattern that is indicative of a known type of data element.

4. The method of claim 1, wherein the one or more data elements of the log entry comprise one or more data elements expressed in an unstructured format, and wherein producing the restructured representation of the log entry comprises:
applying a set of parser functions to the log entry, wherein each respective parser function (i) searches the log entry for a respective type of pattern that is indicative of a known type of data element, and (ii) if any portion of the log entry matches the respective type of pattern, translates the matched portion of the log entry into a token that represents the known type of data element.

5. The method of claim 1, wherein producing the restructured representation of the log entry comprises:
performing a first search of the log entry for data elements expressed in a structured format and translating any data element identified during the first search into at least one corresponding token that represents the data element; and
performing a second search of the log entry for data elements expressed in an unstructured format that match patterns indicative of known types of data elements and translating any data element identified during the second search into at least one corresponding token that represents the data element.

6. The method of claim 1, wherein the handling rule for the derived log identity is defined based on an analysis of write activity for log entries having the derived log identity.

7. The method of claim 1, wherein the handling rule for the derived log identity is defined based on an analysis of read activity for log entries having the derived log identity.

8. The method of claim 1, wherein the handling rule for the derived log identity is defined based on an analysis of query activity for log entries having the derived log identity.

9. A non-transitory computer-readable medium comprising program instructions stored thereon that are executable to cause a computing platform to perform functions comprising:
receiving a log entry that was produced by a log producer, wherein the log entry comprises one or more data elements;
producing a restructured representation of the log entry, the restructured representation comprising a sequence of one or more tokens that represents the one or more data elements of the log entry;
deriving a log identity of the log entry from the sequence of one or more tokens; and
handling the log entry in accordance with a handling rule for the derived log identity, wherein handling the log entry in accordance with the handling rule for the derived log identity comprises one or more of (i) blocking the log entry from being persistently stored, (ii) storing the log entry into a different tier of a multi-tier storage architecture, (iii) handling the log entry in accordance with a sampling rate for storing log data having the derived log identity, (iv) storing the log entry in a compressed format, or (v) storing a metric that is derived based on log entries having the derived log identity either in addition to or in place of the log entry.

10. The non-transitory computer-readable medium of claim 9, wherein the one or more data elements of the log entry comprise one or more key-value pairs, and wherein producing the restructured representation of the log entry comprises:
translating at least a first key-value pair of the log entry into a corresponding token that represents a key of the first key-value pair.

11. The non-transitory computer-readable medium of claim 10, wherein producing the restructured representation of the log entry further comprises:
parsing a value of at least a second key-value pair of the log entry into a sequence of tokens that each represents either (i) a key-value pair that is nested within the value of the second key-value pair or (ii) an unstructured portion of the value that matches a respective type of pattern that is indicative of a known type of data element.

12. The non-transitory computer-readable medium of claim 9, wherein the one or more data elements of the log entry comprise one or more data elements expressed in an unstructured format, and wherein producing the restructured representation of the log entry comprises:
applying a set of parser functions to the log entry, wherein each respective parser function (i) searches the log entry for a respective type of pattern that is indicative of a known type of data element, and (ii) if any portion of the log entry matches the respective type of pattern, translates the matched portion of the log entry into a token that represents the known type of data element.

13. The non-transitory computer-readable medium of claim 9, wherein producing the restructured representation of the log entry comprises:
performing a first search of the log entry for data elements expressed in a structured format and translating any data element identified during the first search into at least one corresponding token that represents the data element; and
performing a second search of the log entry for data elements expressed in an unstructured format that match patterns indicative of known types of data elements and translating any data element identified during the second search into at least one corresponding token that represents the data element.

14. A computing platform comprising:
at least one processor;
at least one non-transitory computer-readable medium; and
program instructions stored on the at least one non-transitory computer-readable medium that are executable by the at least one processor such that the computing platform is configured to:
receive a log entry that was produced by a log producer, wherein the log entry comprises one or more data elements;
produce a restructured representation of the log entry, the restructured representation comprising a sequence of one or more tokens that represents the one or more data elements of the log entry;
derive a log identity of the log entry from the sequence of one or more tokens; and
handle the log entry in accordance with a handling rule for the derived log identity, wherein handling the log entry in accordance with the handling rule for the derived log identity comprises one or more of (i) blocking the log entry from being persistently stored, (ii) storing the log entry into a different tier of a multi-tier storage architecture, (iii) handling the log entry in accordance with a sampling rate for storing log data having the derived log identity, (iv) storing the log entry in a compressed format, or (v) storing a metric that is derived based on log entries having the derived log identity either in addition to or in place of the log entry.

15. The computing platform of claim 14, wherein the program instructions that are executable by the at least one processor such that the computing platform is configured to produce the restructured representation of the log entry comprise program instructions that are executable by the at least one processor such that the computing platform is configured to:
perform a first search of the log entry for data elements expressed in a structured format and translate any data element identified during the first search into at least one corresponding token that represents the data element; and
perform a second search of the log entry for data elements expressed in an unstructured format that match patterns indicative of known types of data elements and translate any data element identified during the second search into at least one corresponding token that represents the data element.

16. The computing platform of claim 14, wherein the one or more data elements of the log entry comprise one or more key-value pairs, and wherein the program instructions that are executable by the at least one processor such that the computing platform is configured to produce the restructured representation of the log entry comprise program instructions that are executable by the at least one processor such that the computing platform is configured to:

translate at least a first key-value pair of the log entry into a corresponding token that represents a key of the first key-value pair.

17. The computing platform of claim 16, wherein the program instructions that are executable by the at least one processor such that the computing platform is configured to produce the restructured representation of the log entry further comprise program instructions that are executable by the at least one processor such that the computing platform is configured to:

parse a value of at least a second key-value pair of the log entry into a sequence of tokens that each represents either (i) a key-value pair that is nested within the value of the second key-value pair or (ii) an unstructured portion of the value that matches a respective type of pattern that is indicative of a known type of data element.

18. The computing platform of claim 14, wherein the one or more data elements of the log entry comprise one or more data elements expressed in an unstructured format, and wherein the program instructions that are executable by the at least one processor such that the computing platform is configured to produce the restructured representation of the log entry comprise program instructions that are executable by the at least one processor such that the computing platform is configured to:

apply a set of parser functions to the log entry, wherein each respective parser function (i) searches the log entry for a respective type of pattern that is indicative of a known type of data element, and (ii) if any portion of the log entry matches the respective type of pattern, translates the matched portion of the log entry into a token that represents the known type of data element.

19. The computing platform of claim 14, wherein the handling rule for the derived log identity is defined based on an analysis of write activity for log entries having the derived log identity.

20. The computing platform of claim 14, wherein the handling rule for the derived log identity is defined based on one or more of (i) an analysis of read activity for log entries having the derived log identity or (ii) an analysis of query activity for log entries having the derived log identity.

* * * * *